(12) United States Patent
Liu

(10) Patent No.: US 11,350,487 B2
(45) Date of Patent: May 31, 2022

(54) SIGNAL PROCESSING METHOD AND RELATED DEVICE

(71) Applicant: Huawei Technologies Co., Ltd., Shenzhen (CN)

(72) Inventor: Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/905,434

(22) Filed: Jun. 18, 2020

(65) Prior Publication Data
US 2020/0413486 A1    Dec. 31, 2020

(30) Foreign Application Priority Data

Jun. 25, 2019   (CN) .......................... 201910554832.0

(51) Int. Cl.
*H04B 1/28*        (2006.01)
*H04W 88/08*       (2009.01)
(Continued)

(52) U.S. Cl.
CPC ........ *H04W 88/085* (2013.01); *H04B 1/0475* (2013.01); *H04B 1/28* (2013.01);
(Continued)

(58) Field of Classification Search
CPC .. H04W 88/085; H04W 88/06; H04B 1/0475; H04B 1/40; H04B 7/024; H04B 10/25753; H04B 1/28
(Continued)

(56) References Cited

U.S. PATENT DOCUMENTS 5,515,378 A * 5/1996 Roy, III ................ H04W 64/00
                                                 370/334
2002/0163897 A1* 11/2002 Horie .................... H04L 1/0052
                                                 370/335
(Continued)

FOREIGN PATENT DOCUMENTS

CN    102111690 A    6/2011
CN    201854275 U    6/2011
(Continued)

OTHER PUBLICATIONS

Mengesha, B., "Comparison of DSP-based TDMA and FDMA channel aggregation techniques in mobile fronthauling," Optical Fiber Technology, vol. 46, 2018, pp. 15-23.
(Continued)

*Primary Examiner* — Emmanuel Bayard
(74) *Attorney, Agent, or Firm* — Conley Rose, P.C.

(57) ABSTRACT

A signal processing method and a related device, where the signal processing method may be applicable to the field of signal transmission between a baseband processing apparatus and a radio frequency apparatus of an access network device. The baseband processing apparatus obtains at least two first downlink digital baseband signals, multiplexes the at least two first downlink digital baseband signals into one second downlink digital baseband signal, and after converting the second downlink digital baseband signal into a first downlink analog baseband signal, sends the first downlink analog baseband signal to the radio frequency apparatus. The radio frequency apparatus demultiplexes the first downlink analog baseband signal, and generates, based on at least two second downlink analog baseband signals obtained by demultiplexing, a downlink radio frequency signal to be sent to a terminal device.

20 Claims, 13 Drawing Sheets

(51) Int. Cl.
- *H04B 1/04* (2006.01)
- *H04B 1/40* (2015.01)
- *H04B 7/024* (2017.01)
- *H04B 10/2575* (2013.01)

(52) U.S. Cl.
CPC ............... *H04B 1/40* (2013.01); *H04B 7/024* (2013.01); *H04B 10/25753* (2013.01)

(58) Field of Classification Search
USPC ................. 375/219, 259, 267, 297, 340; 370/328–329, 336
See application file for complete search history.

(56) References Cited

U.S. PATENT DOCUMENTS

| | | | |
|---|---|---|---|
| 2007/0053311 A1* | 3/2007 | Kim | H04W 88/085 370/280 |
| 2009/0046790 A1* | 2/2009 | Soliman | H04L 27/2626 375/260 |
| 2013/0128717 A1 | 5/2013 | Tamaki et al. | |
| 2014/0243033 A1* | 8/2014 | Wala | H01Q 1/246 455/517 |
| 2014/0349667 A1 | 11/2014 | Hahn et al. | |
| 2015/0010024 A1* | 1/2015 | Dai | H04B 10/25 370/535 |
| 2015/0365934 A1 | 12/2015 | Liu et al. | |
| 2016/0308641 A1 | 10/2016 | Zeng et al. | |
| 2016/0337041 A1* | 11/2016 | Wen | G02F 1/21 |
| 2017/0093495 A1 | 3/2017 | Lozhkin | |
| 2017/0126320 A1* | 5/2017 | Cho | H04B 10/25754 |
| 2017/0230967 A1* | 8/2017 | Jitsukawa | H04L 5/0094 |
| 2018/0124762 A1* | 5/2018 | Zeng | H04L 5/0048 |
| 2018/0159599 A1* | 6/2018 | Sattinger | H04B 7/2606 |
| 2018/0335652 A1* | 11/2018 | Wen | G02B 6/29335 |
| 2019/0379455 A1* | 12/2019 | Wang | H03M 3/458 |
| 2020/0304358 A1* | 9/2020 | Liu | H04W 74/04 |

FOREIGN PATENT DOCUMENTS

| | | |
|---|---|---|
| CN | 103650387 A | 3/2014 |
| CN | 105490743 A | 4/2016 |
| CN | 106788476 A | 5/2017 |
| CN | 107534487 A | 1/2018 |
| JP | 2017069648 A | 4/2017 |
| JP | 2017521976 A | 8/2017 |
| JP | 2018516501 A | 6/2018 |

OTHER PUBLICATIONS

Carpenter, T., et al., "Direct Digital Demultiplexing of Analog TDM Signals for Cable Reduction in Ultrasound Imaging Catheters," IEEE Trans. Ultrasonics, Ferroelectronics, and freq. control, vol. 63, No. 8, Aug. 2016, pp. 1078-1085.

Liu, X., "Efficient Mobile Fronthaul via DSP-Based Channel Aggregation," Journal of Lightwave Technology, vol. 34, No. 6, Mar. 2016, pp. 1556-1564.

Giorgi, L., "Subcarrier Multiplexing RF Plans for Analog Radio Over Fiber in Heterogeneous Networks," Journal of Lightwave Technology, vol. 34, No. 16, Aug. 2016, pp. 3859-3866.

Liu, C., et al., "A Novel Multi-Service Small-Cell Cloud Radio Access Network for Mobile Backhaul and Computing Based on Radio-Over-Fiber Technologies," Journal of Lightwave Technology (vol. 31, Issue: 17), Sep. 1, 2013, 8 pages.

\* cited by examiner

SIGNAL PROCESSING METHOD AND RELATED DEVICE

CROSS-REFERENCE TO RELATED APPLICATION

This application claims priority to Chinese Patent Application No. 201910554832.0 filed on Jun. 25, 2019, which is hereby incorporated by reference in its entirety.

TECHNICAL FIELD

This application relates to the field of communications technologies, and in particular, to a signal processing method and a related device.

BACKGROUND

A cellular communications system is a widely used wireless communications system. In the cellular communications system, a base station provides a radio access service for a terminal device (or user equipment). Currently, remote radio is a communication manner commonly used by the base station. That is, a baseband part and an intermediate radio frequency part of the base station are separately disposed in two separate devices. The baseband part may be located in a baseband unit (BBU), and the intermediate radio frequency part may be located in a remote radio unit (RRU).

In other approaches, a downlink digital baseband signal is usually transmitted between the BBU and the RRU based on a Common Public Radio Interface (CPRI) protocol. Further, the BBU sends the downlink digital signal to the RRU through a CPRI interface, and after converting the downlink digital baseband signal into a downlink analog baseband signal using a digital-to-analog converter (DAC), the RRU sends the downlink analog baseband signal to a terminal device.

As communications technologies develop, there are more frequency bands for a carrier supported by each RRU, and different transmit channels of carriers in different frequency bands. In addition, promotion of a multiple-antenna technology such as multiple-input and multiple-output (MIMO) results in a plurality of transmit channels configured for a carrier in a same frequency band.

One DAC needs to be configured for each transmit channel. The DAC is comparatively complex, power-consuming, and produces high heat. As a result, complexity and power consumption of the RRU are high, and heat dissipation is difficult.

SUMMARY

Embodiments of this application provide a signal processing method and a related device such that a downlink analog baseband signal is sent by a baseband processing apparatus to a radio frequency apparatus. There is no need to configure a DAC on the radio frequency apparatus, which reduces complexity, power consumption, and heat production of the radio frequency apparatus.

To resolve the foregoing problem, the embodiments of this application provide the following technical solutions.

According to a first aspect, an embodiment of this application provides a signal processing method, which is applicable to the field of signal transmission between a baseband processing apparatus and a radio frequency apparatus of an access network device. When the baseband processing apparatus needs to send user data, control data, or other types of data to a terminal device, the baseband processing apparatus obtains at least two first downlink digital baseband signals. The first downlink digital baseband signal is a general concept, and indicates a digital baseband signal that is generated by a baseband part and is not multiplexed. The at least two first downlink digital baseband signals carry data that needs to be sent to the terminal device. Then, the baseband processing apparatus obtains a plurality of first sampling signals from each first downlink digital baseband signal, and then multiplexes the plurality of first sampling signals obtained from the at least two first downlink digital baseband signals into one second downlink digital baseband signal. Further, the baseband processing apparatus and the radio frequency apparatus may prestore a sorting rule used when the plurality of first sampling signals obtained from the at least two first downlink digital baseband signals are multiplexed such that the baseband processing apparatus may perform a multiplexing operation according to the prestored sorting rule. Both the first sampling signal and the second downlink digital baseband signal are a general concept, the first sampling signal indicates a sampling signal obtained when the baseband processing apparatus samples the downlink digital baseband signal, and the second downlink digital baseband signal indicates a digital baseband signal obtained after multiplexing. Then, the baseband processing apparatus may convert the second downlink digital baseband signal into a first downlink analog baseband signal, and send the first downlink analog baseband signal to the radio frequency apparatus. After receiving the first downlink analog baseband signal, the radio frequency apparatus may demultiplex the first downlink analog baseband signal in a sampling form, to obtain a plurality of second sampling signals, and further separately obtains, according to the prestored sorting rule, from the plurality of second sampling signals, a sampling signal corresponding to each of the at least two second downlink analog baseband signals. That is, the radio frequency apparatus obtains the at least two second downlink analog baseband signals. The second sampling signal is also a general concept, and indicates a signal obtained by the radio frequency apparatus by sampling the first downlink analog baseband signal. Finally, the radio frequency apparatus may perform up-conversion frequency mixing on each second downlink analog baseband signal, to generate a downlink radio frequency signal to be sent to the terminal device. In this implementation, after obtaining the downlink digital signal, the baseband processing apparatus first converts the downlink digital baseband signal into the downlink analog baseband signal, and sends the downlink analog baseband signal to the radio frequency apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

In a possible implementation of the first aspect, because the at least two first downlink digital baseband signals generated by the baseband processing apparatus need to be transmitted by the radio frequency apparatus through at least one downlink carrier, the baseband processing apparatus may determine to use a downlink carrier at which frequency to transmit the at least two first downlink digital baseband signals. Before sending the first downlink analog baseband signal to the radio frequency apparatus, the baseband processing apparatus may obtain a downlink carrier corresponding to the at least two first downlink digital baseband signals. A correspondence between the at least two first downlink digital baseband signals and the downlink carrier is many-to-one or many-to-many. The downlink carrier is used by the radio frequency apparatus to perform up-conversion frequency mixing on the at least two second downlink analog baseband signals and the downlink carrier, to generate the downlink radio frequency signal to be sent to the terminal device. That the baseband processing apparatus sends the first downlink analog baseband signal to the radio frequency apparatus includes that the baseband processing apparatus combines the downlink carrier and the first downlink analog baseband signal, and sends the combined downlink carrier and first downlink analog baseband signal to the radio frequency apparatus. In this implementation, the baseband processing apparatus produces the downlink carrier, and the radio frequency apparatus may directly perform the up-conversion frequency mixing using the downlink carrier sent by the baseband processing apparatus. In a scenario in which one baseband processing apparatus simultaneously communicates with a plurality of radio frequency apparatuses, because all downlink carriers used in the plurality of radio frequency apparatuses are downlink carriers generated by a same baseband processing apparatus, frequency deviation between the plurality of radio frequency apparatuses is avoided, and a distributed MIMO function formed by the plurality of radio frequency apparatuses is implemented in a downlink direction.

In a possible implementation of the first aspect, that the baseband processing apparatus sends the first downlink analog baseband signal to the radio frequency apparatus may further include that the baseband processing apparatus obtains a first sampling clock signal, combines the first sampling clock signal and the first downlink analog baseband signal, and then sends the combined sampling clock signal and first downlink analog baseband signal to the radio frequency apparatus. The first sampling clock signal is a general concept, and indicates a sampling clock signal that is in a sampling clock signal generated by a frequency generator and that is sent to the radio frequency apparatus. The first sampling clock signal is used to generate a first timing control signal by the radio frequency apparatus for demultiplexing the first downlink analog baseband signal. A preset relationship may exist between a frequency value of the first sampling clock signal and a bandwidth value of the first downlink analog baseband signal. In this implementation, the baseband processing apparatus sends the first sampling clock signal to the radio frequency apparatus in a combination manner. This ensures the same first sampling clock signal is used between the baseband processing apparatus and the radio frequency apparatus, and feasibility of this solution is improved with a simple and convenient operation.

In a possible implementation of the first aspect, that the radio frequency apparatus receives the first downlink analog baseband signal sent by the baseband processing apparatus may include After receiving combined at least one downlink carrier and first downlink analog baseband signal sent by the baseband processing apparatus, the radio frequency apparatus may split the combined downlink carrier and first downlink analog baseband signal using a splitter. Further, the radio frequency apparatus may obtain the first downlink analog baseband signal using a low-pass filter (LPF), or may obtain the at least one downlink carrier using at least one narrowband band-pass filter. That the radio frequency apparatus generates, based on the at least two second downlink analog baseband signals, the downlink radio frequency signal to be sent to the terminal device may include that the radio frequency apparatus determines a correspondence between the at least two second downlink analog baseband signals and the at least one downlink carrier, and further performs up-conversion frequency mixing on each second downlink analog baseband signal and a corresponding downlink carrier, to generate at least two downlink radio frequency signals to be sent to the terminal device. In this implementation, the baseband processing apparatus produces the downlink carrier, and the radio frequency apparatus may directly perform the up-conversion frequency mixing using the downlink carrier sent by the baseband processing apparatus. In the scenario in which one baseband processing apparatus simultaneously communicates with the plurality of radio frequency apparatuses, because all the downlink carriers used in the plurality of radio frequency apparatuses are the downlink carriers generated by the same baseband processing apparatus, the frequency deviation between the plurality of radio frequency apparatuses is avoided, and the distributed MIMO function formed by the plurality of radio frequency apparatuses is implemented in the downlink direction.

In a possible implementation of the first aspect, that the radio frequency apparatus receives the first downlink analog baseband signal sent by the baseband processing apparatus may include after receiving the combined first sampling clock signal and first downlink analog baseband signal sent by the baseband processing apparatus, the radio frequency apparatus needs to split the combined first sampling clock signal and first downlink analog baseband signal. Further, the radio frequency apparatus may first obtain the first downlink analog baseband signal using a LPF. If the radio frequency apparatus prestores the preset relationship between the frequency value of the first sampling clock signal and the bandwidth value of the first downlink analog baseband signal, the radio frequency apparatus may determine the frequency value of the first sampling clock signal based on the bandwidth value of the first downlink analog baseband signal, and further obtains the first sampling clock signal using a narrowband band-pass filter at a corresponding frequency. That the radio frequency apparatus demultiplexes the first downlink analog baseband signal, to obtain the at least two second downlink analog baseband signals includes that the radio frequency apparatus generates the first timing control signal based on the sampling clock signal. If a relationship between a frequency value of the first timing control signal and a frequency value of the first downlink analog baseband signal meets a Nyquist sampling requirement, the radio frequency apparatus may demultiplex the first downlink analog baseband signal using the first timing control signal, to obtain the at least two second downlink analog baseband signals. In this implementation, after receiving the first sampling clock signal sent in the combination manner, the radio frequency apparatus may separate the first sampling clock signal from the combined signal using the splitter. This ensures the same first sampling clock signal is used between the baseband processing apparatus and the radio frequency apparatus, and the feasibility of this solution is improved with the simple and convenient operation.

According to a second aspect, an embodiment of this application further provides a signal processing method, which is applicable to the field of signal transmission between a baseband processing apparatus and a radio frequency apparatus of an access network device. The radio frequency apparatus may receive at least two uplink radio frequency signals sent by a terminal device. The uplink radio frequency signal may carry control data or user data. The radio frequency apparatus may obtain at least one uplink frequency mixing signal corresponding to the at least two uplink radio frequency signals, and perform down-conversion frequency mixing on each of the at least two uplink radio frequency signals and the corresponding uplink frequency mixing signal, to obtain at least two first uplink analog signals. The first uplink analog signal is a general concept, and indicates a signal obtained after the down-conversion frequency mixing is performed on the uplink radio frequency signal. Further, the radio frequency apparatus may sample each first uplink analog signal, to obtain a plurality of third sampling signals, and multiplex the plurality of third sampling signals obtained from the at least two first uplink analog signals, to obtain a second uplink analog signal. Further, the radio frequency apparatus may store a sorting rule used when the plurality of third sampling signals are multiplexed such that the radio frequency apparatus multiplexes the plurality of third sampling signals according to the prestored sorting rule. Then, the radio frequency apparatus sends the second uplink analog signal to the baseband processing apparatus. After receiving the second uplink analog signal sent by the radio frequency apparatus, the baseband processing apparatus may convert the second uplink analog signal into a first uplink digital signal, and demultiplex the first uplink digital signal according to the sorting rule used when the radio frequency apparatus multiplexes the plurality of third sampling signals, to obtain at least two second uplink digital signals. In this implementation, after obtaining the at least two uplink radio frequency signals, the radio frequency apparatus first performs down-conversion, to obtain the at least two first uplink analog signals, and after multiplexing the at least two first uplink analog signals into one second uplink analog signal, the radio frequency apparatus directly sends the second uplink analog signal to the baseband processing apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

In a possible implementation of the second aspect, because the baseband processing apparatus is responsible for allocating uplink and downlink time-frequency resources, the baseband processing apparatus may determine the at least one uplink frequency mixing signal corresponding to the at least two uplink radio frequency signals. The radio frequency apparatus may receive the uplink frequency mixing signal sent by the baseband processing apparatus. When a communication manner used for a target uplink radio frequency signal in the at least two uplink radio frequency signals is time division duplex (TDD), for an uplink radio frequency signal and a downlink analog baseband signal working on a carrier at a same frequency, the uplink frequency mixing signal and a downlink carrier may be represented as a same square wave signal, or when a communication manner used for a target uplink radio frequency signal in the at least two uplink radio frequency signals is frequency-division duplexing (FDD), for an uplink radio frequency signal and a downlink analog baseband signal working on a carrier at a same frequency, the uplink frequency mixing signal and a downlink carrier may be represented as different square wave signals. After receiving the at least one uplink frequency mixing signal, the radio frequency apparatus may determine a correspondence between the at least two uplink radio frequency signals and the uplink frequency mixing signal, and further perform the down-conversion frequency mixing on each of the at least two uplink radio frequency signals and the corresponding uplink frequency mixing signal, to obtain the at least two first uplink analog signals. In this implementation, the baseband processing apparatus produces the uplink frequency mixing signal, and the radio frequency apparatus may directly perform the down-conversion frequency mixing using the uplink frequency mixing signal sent by the baseband processing apparatus. In a scenario in which one baseband processing apparatus simultaneously communicates with a plurality of radio frequency apparatuses, because all the uplink frequency mixing signals used in the plurality of radio frequency apparatuses are the uplink frequency mixing signals generated by a same baseband processing apparatus, frequency deviation between the plurality of radio frequency apparatuses is avoided, and a distributed MIMO function formed by the plurality of radio frequency apparatuses is implemented in an uplink direction.

In a possible implementation of the second aspect, the method may further include that the radio frequency apparatus receives a second sampling clock signal sent by the baseband processing apparatus. The second sampling signal and a first sampling signal may be a same signal, and may be a second sampling signal obtained after the radio frequency apparatus receives combined first downlink analog baseband signal, uplink frequency mixing signal, and second sampling clock signal sent by the baseband processing apparatus, and splits the combined first downlink analog baseband signal, uplink frequency mixing signal, and second sampling clock signal. That the radio frequency apparatus multiplexes the at least two first uplink analog signals into the second uplink analog signal may include that the radio frequency apparatus generates a second timing control signal based on the sampling clock signal. The second timing control signal indicates a timing control signal used during multiplexing. A relationship between a frequency value of the second timing control signal and a total bandwidth value of the at least two first uplink analog signals meets a Nyquist sampling requirement. Then, the radio frequency apparatus multiplexes the at least two first uplink analog signals into the second uplink analog signal using the second timing control signal. In this implementation, the radio frequency apparatus may receive a sampling clock signal that is in an analog signal form and that is sent by the baseband processing apparatus. After obtaining the sampling clock signal, the radio frequency apparatus does not need to perform digital to analog conversion on the sampling clock signal, which alleviates work load of the radio frequency apparatus and improves efficiency in a signal processing process. In addition, when performing an operation in the uplink direction, the radio frequency apparatus may multiplex a sampling clock signal obtained in a downlink direction, which reduces a communication resource between the baseband processing apparatus and the radio frequency apparatus.

In a possible implementation of the second aspect, because the baseband processing apparatus is responsible for allocating the uplink and downlink time-frequency resources, the baseband processing apparatus may learn of a frequency value of an uplink carrier used by the at least two uplink radio frequency signals. After determining the at least one uplink frequency mixing signal corresponding to the at least two uplink radio frequency signals, the baseband processing apparatus sends the at least one uplink frequency mixing signal to the radio frequency apparatus. The uplink frequency mixing signal is used by the radio frequency apparatus to perform the down-conversion frequency mixing on the at least two uplink radio frequency signals and the uplink frequency mixing signal. A quantity of uplink frequency mixing signals and a frequency value of the uplink frequency mixing signal each have a correspondence with the frequency of the carrier used by the at least two uplink radio frequency signals. Further, when the communication manner used for the target uplink radio frequency signal in the at least two uplink radio frequency signals is the TDD, for the uplink radio frequency signal and the downlink analog baseband signal working on the carrier at the same frequency, the uplink frequency mixing signal and the downlink carrier may be represented as the same square wave signal, or when the communication manner used for the target uplink radio frequency signal in the at least two uplink radio frequency signals is the FDD, for the uplink radio frequency signal and the downlink analog baseband signal working on the carrier at the same frequency, the uplink frequency mixing signal and the downlink carrier may be represented as the different square wave signals. In this implementation, the baseband processing apparatus produces the uplink frequency mixing signal, and the radio frequency apparatus may directly perform the down-conversion frequency mixing using the uplink frequency mixing signal sent by the baseband processing apparatus. In the scenario in which one baseband processing apparatus simultaneously communicates with the plurality of radio frequency apparatuses, because all the uplink frequency mixing signals used in the plurality of radio frequency apparatuses are the uplink frequency mixing signals generated by the same baseband processing apparatus, the frequency deviation between the plurality of radio frequency apparatuses is avoided, and the distributed MIMO function formed by the plurality of radio frequency apparatuses is implemented in the uplink direction.

In a possible implementation of the second aspect, the method may further include The baseband processing apparatus sends the second sampling clock signal to the radio frequency apparatus. The second sampling clock signal is used to generate the second timing control signal by the radio frequency apparatus for multiplexing the at least two first uplink analog signals. Further, the baseband processing apparatus may send the combined first downlink analog baseband signal, uplink frequency mixing signal, and second sampling clock signal to the radio frequency apparatus. The combined first downlink analog baseband signal, uplink frequency mixing signal, and second sampling clock signal is used by the radio frequency apparatus to obtain the second sampling signal by splitting. In this implementation, the baseband processing apparatus may send the sampling clock signal in the analog signal form to the radio frequency apparatus. After obtaining the sampling clock signal, the radio frequency apparatus does not need to perform the digital to analog conversion on the sampling clock signal, which alleviates the work load of the radio frequency apparatus and improves the efficiency in the signal processing process. In addition, when performing the operation in the uplink direction, the radio frequency apparatus may multiplex the sampling clock signal obtained in the downlink direction, which reduces the communication resource between the baseband processing apparatus and the radio frequency apparatus.

According to a third aspect, an embodiment of this application further provides a radio access device. The radio access device includes a baseband processing apparatus and a radio frequency apparatus, the baseband processing apparatus includes an obtaining unit, a multiplexing unit, a conversion unit, and a sending unit, and the radio frequency apparatus includes a receiving unit, a demultiplexing unit, and a generation unit. The obtaining unit is configured to obtain at least two first downlink digital baseband signals. The multiplexing unit is configured to multiplex the at least two first downlink digital baseband signals obtained by the obtaining unit into one second downlink digital baseband signal. The conversion unit is configured to convert the second downlink digital baseband signal output by the multiplexing unit into a first downlink analog baseband signal. The sending unit is configured to send the first downlink analog baseband signal output by the conversion unit to the radio frequency apparatus. The receiving unit is configured to receive the first downlink analog baseband signal sent by the baseband processing apparatus. The demultiplexing unit is configured to demultiplex the first downlink analog baseband signal received by the receiving unit, to obtain at least two second downlink analog baseband signals. The generation unit is configured to generate, based on the at least two second downlink analog baseband signals output by the demultiplexing unit, a downlink radio frequency signal to be sent to a terminal device.

In a possible implementation of the third aspect, the obtaining unit is further configured to obtain a downlink carrier corresponding to the at least two first downlink digital baseband signals. The sending unit is further configured to combine the downlink carrier obtained by the obtaining unit and the first downlink analog baseband signal output by the conversion unit, and send the combined downlink carrier and first downlink analog baseband signal to the radio frequency apparatus. The downlink carrier is used by the radio frequency apparatus to perform up-conversion frequency mixing on the at least two second downlink analog baseband signals and the downlink carrier, to generate the downlink radio frequency signal to be sent to the terminal device.

In a possible implementation of the third aspect, the sending unit is configured to combine a sampling clock signal with the first downlink analog baseband signal generated by the conversion unit, and send the combined sampling clock signal and first downlink analog baseband signal to the radio frequency apparatus. The sampling clock signal is used to generate a first timing control signal by the radio frequency apparatus for demultiplexing the first downlink analog baseband signal.

In a possible implementation of the third aspect, the receiving unit is configured to receive the combined downlink carrier and first downlink analog baseband signal sent by the baseband processing apparatus, and split the combined downlink carrier and first downlink analog baseband signal. The generation unit is configured to perform the up-conversion frequency mixing on the at least two second downlink analog baseband signals output by the demultiplexing unit and the downlink carrier received by the receiving unit, to generate the downlink radio frequency signal to be sent to the terminal device.

In a possible implementation of the third aspect, the receiving unit is configured to receive the combined sampling clock signal and first downlink analog baseband signal sent by the baseband processing apparatus. The radio frequency apparatus splits the combined sampling clock signal and first downlink analog baseband signal. The demultiplexing unit is configured to generate the first timing control signal based on the sampling clock signal received by the receiving unit, and demultiplex, using the first timing control signal, the first downlink analog baseband signal received by the receiving unit, to obtain the at least two second downlink analog baseband signals.

For specific implementation steps of the third aspect and the possible implementations of the third aspect performed by the composition modules of the baseband processing apparatus and the radio frequency apparatus provided in the third aspect of this application, and beneficial effects brought by each implementation, refer to the descriptions in the first aspect and the possible implementations of the first aspect. Details are not described herein one by one again.

According to a fourth aspect, an embodiment of this application further provides a radio access device. The radio access device includes a radio frequency apparatus and a baseband processing apparatus, the radio frequency apparatus includes a first receiving unit, a down-conversion unit, a multiplexing unit, and a first sending unit, and the baseband processing apparatus includes a second receiving unit, a conversion unit, and a demultiplexing unit. The first receiving unit is configured to receive at least two uplink radio frequency signals sent by a terminal device. The down-conversion unit is configured to perform down-conversion on the at least two uplink radio frequency signals received by the first receiving unit, to obtain at least two first uplink analog signals. The multiplexing unit is configured to multiplex the at least two first uplink analog signals output by the down-conversion unit into a second uplink analog signal. The first sending unit is configured to send the second uplink analog signal to the baseband processing apparatus. The second receiving unit is configured to receive the second uplink analog signal sent by the sending unit. The conversion unit is configured to convert the second uplink analog signal received by the second receiving unit into a first uplink digital signal. The demultiplexing unit is configured to demultiplex the first uplink digital signal output by the conversion unit, to obtain at least two second uplink digital signals.

In a possible implementation of the fourth aspect, the radio frequency apparatus further includes a third receiving unit, and the baseband processing apparatus further includes a second sending unit. The third receiving unit is configured to receive an uplink frequency mixing signal sent by the second sending unit. The down-conversion unit is configured to perform down-conversion frequency mixing on the at least two uplink radio frequency signals received by the first receiving unit and the uplink frequency mixing signal received by the third receiving unit.

In a possible implementation of the fourth aspect, the radio frequency apparatus further includes the third receiving unit, and the baseband processing apparatus further includes the second sending unit. The third receiving unit is configured to receive a sampling clock signal sent by the second sending unit. The demultiplexing unit is configured to generate a second timing control signal based on the sampling clock signal received by the third receiving unit, and multiplex, using the second timing control signal, the at least two first uplink analog signals received by the first receiving unit into the second uplink analog signal.

In a possible implementation of the fourth aspect, the baseband processing apparatus further includes the second sending unit configured to send the uplink frequency mixing signal to the third receiving unit. The uplink frequency mixing signal is used by the down-conversion unit to perform the down-conversion frequency mixing on the at least two uplink radio frequency signals and the uplink frequency mixing signal.

In a possible implementation of the fourth aspect, the baseband processing apparatus further includes the second sending unit configured to send the sampling clock signal to the third receiving unit. The sampling clock signal is used to generate the second timing control signal by the demultiplexing unit for multiplexing the at least two first uplink analog signals.

For specific implementation steps of the fourth aspect and the possible implementations of the fourth aspect performed by the composition modules of the radio frequency apparatus and the baseband processing apparatus provided in the fourth aspect of this application, and beneficial effects brought by each implementation, refer to the descriptions in the second aspect and the possible implementations of the second aspect. Details are not described herein one by one again.

According to a fifth aspect, an embodiment of this application further provides a radio access device. The radio access device includes a baseband processing apparatus and a radio frequency apparatus, the baseband processing apparatus includes a baseband part, a multiplexing module, a DAC, and a first output interface, and the radio frequency apparatus includes a second input interface, a demultiplexing multiplexer switch, and a radio frequency signal generation module. The baseband part is configured to obtain at least two first downlink digital baseband signals. The multiplexing module is configured to multiplex the at least two first downlink digital baseband signals obtained by the baseband part into one second downlink digital baseband signal. The DAC is configured to convert the second downlink digital baseband signal output by the multiplexing multiplexer switch into a first downlink analog baseband signal, and send the first downlink analog baseband signal to the radio frequency apparatus through the first output interface. The second input interface is configured to receive the first downlink analog baseband signal sent by the baseband processing apparatus. The demultiplexing multiplexer switch is configured to demultiplex the first downlink analog baseband signal received by the second input interface, to obtain at least two second downlink analog baseband signals. The radio frequency signal generation module is configured to generate, based on the at least two second downlink analog baseband signals output by the demultiplexing multiplexer switch, a downlink radio frequency signal to be sent to a terminal device.

In the fifth aspect of this application, the radio access device may further be configured to perform the steps performed by the radio access device in the possible implementations of the first aspect. For details, refer to the first aspect. Details are not described herein again.

According to a sixth aspect, an embodiment of this application further provides a radio access device. The radio access device includes a radio frequency apparatus and a baseband processing apparatus, the radio frequency apparatus includes an antenna, a down-converter, a multiplexing multiplexer switch, and a second output interface, and the baseband processing apparatus includes a first input interface, an analog-to-digital converter (ADC), and a demultiplexing module. The antenna is configured to receive at least two uplink radio frequency signals sent by a terminal device. The down-converter is configured to perform down-conversion on the at least two uplink radio frequency signals received by the antenna, to obtain at least two first uplink analog signals. The multiplexing multiplexer switch is configured to multiplex the at least two first uplink analog signals output by the down-converter into a second uplink analog signal, and send to the radio frequency apparatus through the second output interface, the second uplink analog signal output by the multiplexing multiplexer switch. The first input interface is configured to receive the second uplink analog signal sent by the baseband processing apparatus. The ADC is configured to convert the second uplink analog signal received by the first input interface into a first uplink digital signal. The demultiplexing module is configured to demultiplex the first uplink digital signal converted by the ADC, to obtain at least two second uplink digital signals.

In the sixth aspect of this application, the radio access device may further be configured to perform the steps performed by the radio access device in the possible implementations of the first aspect. For details, refer to the first aspect. Details are not described herein again.

According to a seventh aspect, an embodiment of this application provides a computer-readable storage medium, and the computer-readable storage medium stores a computer program. When the computer program runs on a computer, the computer is enabled to perform the signal processing method according to the first aspect or the second aspect.

According to an eighth aspect, an embodiment of this application provides a computer program. When the computer program runs on a computer, the computer is enabled to perform the signal processing method according to the first aspect or the second aspect.

According to a ninth aspect, this application provides a chip system. The chip system includes a processor configured to support a baseband processing apparatus or a radio frequency apparatus in implementing functions in the foregoing aspects, for example, sending or processing data and/or information in the foregoing methods. In a possible design, the chip system further includes a memory, and the memory is configured to store a program instruction and data that are necessary for the baseband processing apparatus or the radio frequency apparatus. The chip system may include a chip, or may include a chip and another discrete device.

DESCRIPTION OF EMBODIMENTS

Embodiments of this application provide a signal processing method and a related device such that a downlink analog baseband signal is sent by a baseband processing apparatus to a radio frequency apparatus. There is no need to configure a DAC on the radio frequency apparatus, which reduces complexity, power consumption, and heat production of the radio frequency apparatus.

The following describes the embodiments of this application with reference to accompanying drawings. A person of ordinary skill in the art may learn that as a technology evolves and a new scenario emerges, the technical solutions provided in the embodiments of this application are also applicable to a similar technical problem.

In the specification, claims, and accompanying drawings of this application, the terms "first", "second", and so on are intended to distinguish between similar objects, but do not necessarily indicate a specific order or sequence. It should be understood that the terms used in such a way are interchangeable in appropriate circumstances, which is merely a discrimination manner that is used when objects having a same attribute are described in the embodiments of this application. In addition, the terms "include", "contain" and any other variants mean to cover the non-exclusive inclusion such that a process, method, system, product, or device that includes a series of units is not necessarily limited to those units, but may include other units not expressly listed or inherent to such a process, method, product, or device.

This application may be applicable to radio access devices in a plurality of communications systems, including but not limited to a Global System for Mobile Communications (GSM), a code-division multiple access (CDMA) system, a wideband CDMA (WCDMA) system, a General Packet Radio Service (GPRS) system, a Long-Term Evolution (LTE) system, an LTE-FDD system, an LTE-TDD system, a Universal Mobile Telecommunications System (UMTS), another wireless communications system using an orthogonal frequency-division multiplexing (OFDM) technology, a developing 5th generation (5G) communications system, and any future applicable communications systems.

The radio access device is configured to send a wireless signal in a downlink direction to a terminal device and receive a wireless signal in an uplink direction from the terminal device in order to perform bidirectional wireless communication with the terminal device. The radio access device may be a base station (BS) in a cellular communications system, such as a BS, a nodeB, an evolved node BS (eNB), a 5G system, or a BS in New Radio (NR) (i.e., gNB), or may be a network device having a function similar to that of a BS in a wireless local area network, for example, a WI-FI access point (AP). Certainly, the radio access device may alternatively be another network device having a function similar to that of a BS.

Figure 1:
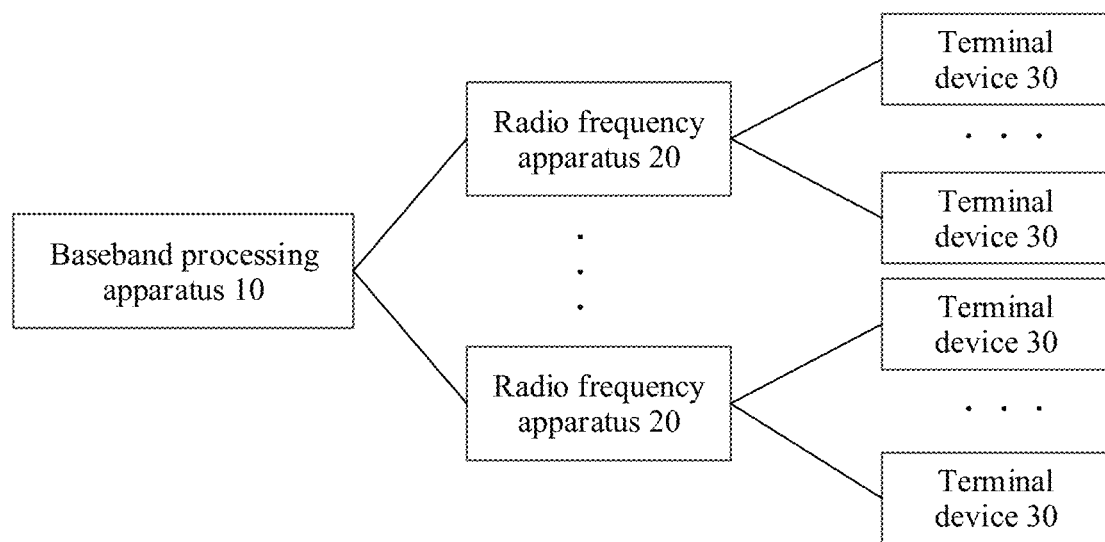
FIG. 1 is a schematic diagram of a network architecture of a scenario to which a signal processing method is applicable according to an embodiment of this application.

Further, refer to FIG. 1. FIG. 1 is a schematic diagram of a network architecture of a scenario to which a signal processing method is applicable according to an embodiment of this application. A radio access device includes a baseband processing apparatus 10 and a radio frequency apparatus 20. The baseband processing apparatus 10 is configured to obtain a plurality of downlink signals, and after multiplexing the plurality of signals, send a downlink signal to the radio frequency apparatus through a communications interface between the baseband processing apparatus 10 and the radio frequency apparatus 20. After demultiplexing the downlink signal, the radio frequency apparatus 20 generates a radio frequency signal corresponding to the downlink signal, and then sends the radio frequency signal to a terminal device 30. Correspondingly, the radio frequency apparatus 20 is further configured to receive a plurality of uplink signals sent by the terminal device 30, perform a frequency conversion operation on the uplink signals, multiplex the plurality of uplink signals, and send an uplink signal to the baseband processing apparatus 10 through the interface between the baseband processing apparatus 10 and the radio frequency apparatus 20. The baseband processing apparatus 10 demultiplexes the uplink signal, to obtain a plurality of uplink signals. For example, the radio access device is a gNB, the baseband processing apparatus is represented as a BBU, and the radio frequency apparatus is represented as an RRU, or may be referred to as a remote radio head (RRH). It should be understood that, when the radio access device is represented in another form, the radio access device may be understood with reference to the foregoing examples, and specific representation forms of the baseband processing apparatus and the radio frequency apparatus in the other form are not described herein one by one as examples.

The baseband processing apparatus 10 and the radio frequency apparatus 20 may be integrated into a same radio access device, or may be separately disposed in two separate devices. The baseband processing apparatus 10 and the radio frequency apparatus 20 may communicate with each other through an optical fiber, a cable, or another manner. It should be understood that, specific presentation manners of the baseband processing apparatus 10 and the radio frequency apparatus 20 may be flexibly determined based on an actual situation. This is not limited herein. Further, one baseband processing apparatus 10 may simultaneously communicate with one or more radio frequency apparatuses 20, and one radio frequency apparatus 20 may simultaneously communicate with one or more terminal devices 30. Although FIG. 1 shows that one baseband processing apparatus 10 simultaneously communicates with two radio frequency apparatuses 20, and one radio frequency apparatus 20 communicates with two terminal devices 30, it should be understood that the example in FIG. 1 is merely used for ease of understanding of this solution, and is not used to limit this solution.

It should be noted that the baseband processing apparatus 10 and the radio frequency apparatus 20 in this embodiment of this application may be an entire network device, or may be a chip applicable to a network device or other combined components having a function of the network device. In this embodiment of this application, an example in which the baseband processing apparatus 10 is the BBU, the radio frequency apparatus 20 is the RRU, and the BBU communicates with the RRU through the optical fiber is used for description.

Figure 2A:
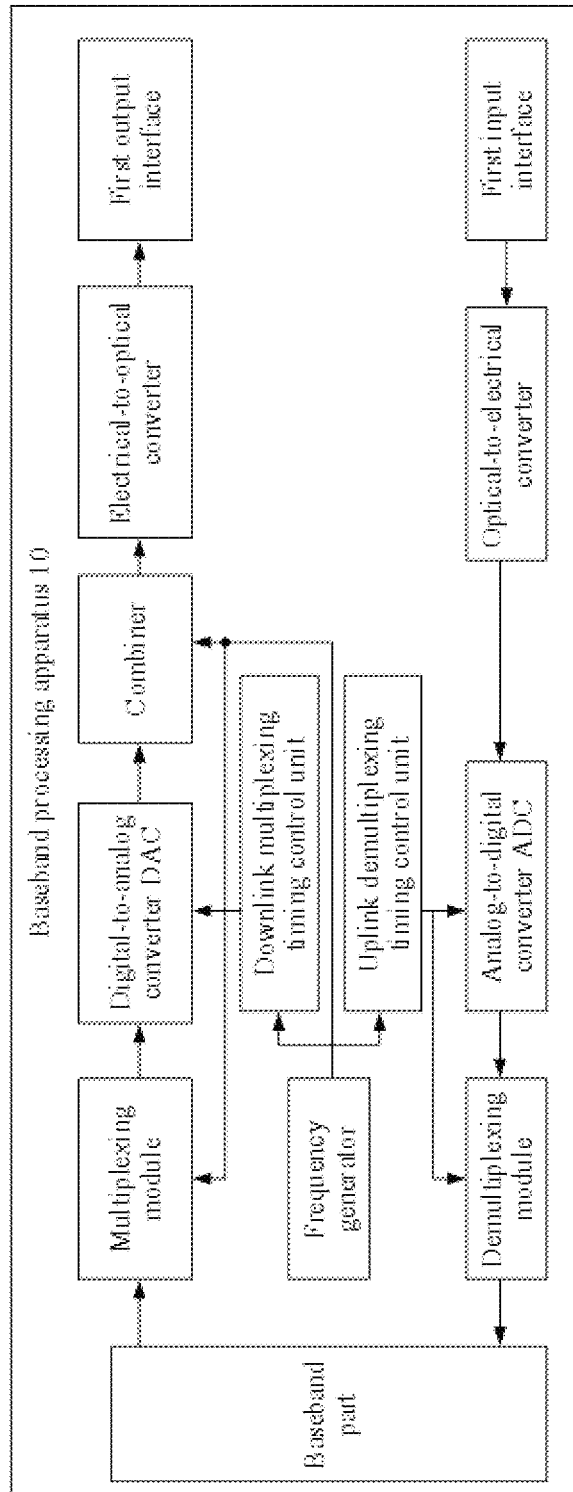
FIG. 2A is a schematic diagram of a structure of a baseband processing apparatus according to an embodiment of this application.
Figure 2B:
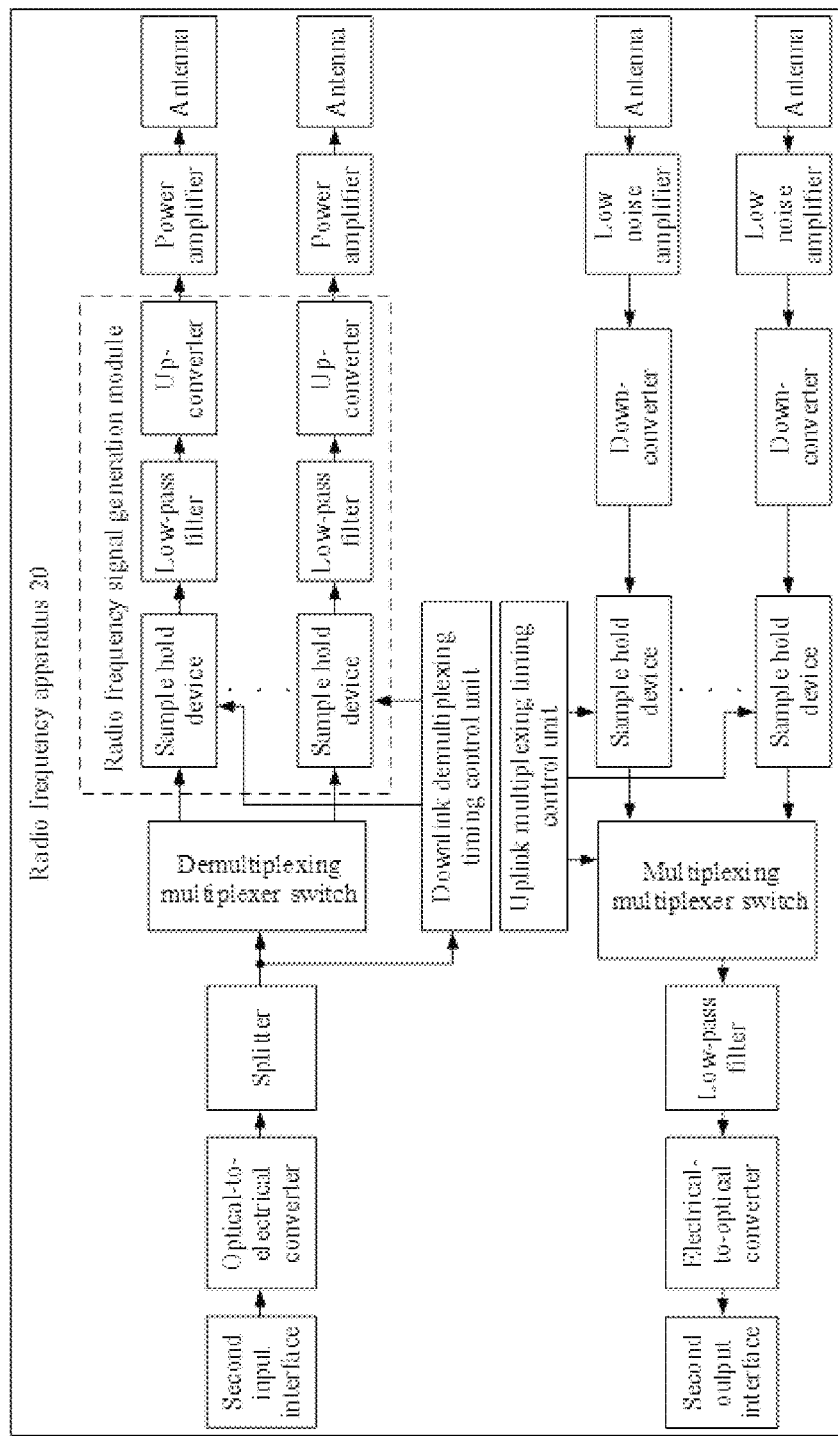
FIG. 2B is a schematic diagram of a structure of a radio frequency apparatus according to an embodiment of this application.

Further, refer to FIG. 2A and FIG. 2B. FIG. 2A is a schematic diagram of a structure of the baseband processing apparatus 10 according to this embodiment of this application, and FIG. 2B is a schematic diagram of a structure of the radio frequency apparatus 20 according to this embodiment of this application. Referring to FIG. 2A first, the baseband processing apparatus 10 may include a baseband part, a frequency generator, a downlink multiplexing timing control unit, an uplink demultiplexing timing control unit, a multiplexing module, a DAC, a combiner, an electrical-to-optical converter, a first output interface, a first input interface, an ADC, a demultiplexing module, and an optical-to-electrical converter.

The baseband part is configured to obtain a downlink digital baseband signal and process an uplink digital signal. The frequency generator is configured to produce a sampling clock signal, a downlink carrier, and an uplink frequency mixing signal. Both the downlink multiplexing timing control unit and the uplink demultiplexing timing control unit are configured to generate a plurality of timing control signals based on the sampling clock signal. The multiplexing module is configured to multiplex the plurality of downlink digital baseband signals generated by the BBU into one downlink digital baseband signal under control of the timing control signal generated by the downlink multiplexing timing control unit. The DAC is configured to convert the downlink digital baseband signal generated by the multiplexing module into one downlink analog baseband signal. The combiner is configured to combine the downlink analog baseband signal with any one or more of the sampling clock signal, the downlink carrier, and the uplink frequency mixing signal, to form the combined signal. The electrical-to-optical converter is configured to convert the combined signal in an electrical signal form into a combined signal in an optical signal form. The first output interface is configured to send the combined signal in the optical signal form to the radio frequency apparatus 20. The first input interface is configured to receive an uplink analog signal that is in an optical signal form and that is sent by the radio frequency apparatus. The electrical-to-optical converter is configured to convert the uplink analog signal in the optical signal form into an uplink analog signal in an electrical signal form. The ADC is configured to convert the uplink analog signal into an uplink digital signal under the control of the timing control signal generated by the uplink demultiplexing timing control unit. The demultiplexing module is configured to demultiplex the uplink digital signal under the control of the timing control signal generated by the uplink demultiplexing timing control unit, and transmit a plurality of obtained digital signals to the baseband part for data processing.

Then, referring to FIG. 2B, elements configured to implement functions in a downlink direction in the radio frequency apparatus 20 may include a second input interface, an optical-to-electrical converter, a splitter, a downlink demultiplexing timing control unit, a demultiplexing multiplexer switch, a radio frequency signal generation module, a plurality of power amplifiers, and a plurality of antennas. The radio frequency signal generation module includes a plurality of sample hold devices, a plurality of LPFs, and a plurality of up-converters. Elements configured to implement functions in an uplink direction in the radio frequency apparatus 20 may include a plurality of antennas, a plurality of low noise amplifiers (LNAs), a plurality of down-converters, a plurality of sample hold devices, a multiplexing multiplexer switch, a LPF, an electrical-to-optical converter, and a second output interface.

The second input interface is configured to receive a combined signal that is in an optical signal form and that is sent by the baseband processing apparatus 10. The optical-to-electrical converter is configured to convert the combined signal that is in the optical signal form and that is obtained using the second input interface into a combined signal in an electrical signal form. The splitter is configured to split the combined signal, to obtain one downlink analog baseband signal and one or more of a sampling clock signal, a downlink carrier, or an uplink frequency mixing signal. Both the downlink demultiplexing timing control unit and the uplink multiplexing timing control unit are configured to generate a plurality of timing control signals based on the sampling clock signal. The multiplexing multiplexer switch is configured to demultiplex, under control of the timing control signal generated by the downlink demultiplexing timing control unit, one downlink analog baseband signal output by the divider, to obtain a plurality of downlink analog baseband signals. The sample hold device is configured to perform sampling and holding on a sampling signal. The LPF is configured to smoothly process a signal including a high frequency component. The up-converter is configured to perform up-conversion frequency mixing on the plurality of downlink analog baseband signals. The power amplifier is configured to perform power amplification on a signal obtained after up-conversion. The antenna is configured to send a signal output by the power amplifier, and further configured to receive an uplink radio frequency signal sent by a terminal device 30. The LNA is configured to perform power amplification on the uplink radio frequency signal received through the antenna. The down-converter is configured to perform down-conversion frequency mixing on the uplink radio frequency signal, to obtain an uplink analog signal. The multiplexing multiplexer switch is configured to multiplex a plurality of uplink analog signals into one uplink analog signal under the control of the timing control signal generated by the uplink multiplexing timing control unit. The electrical-to-optical converter is configured to convert an uplink analog signal in an electrical signal form into an uplink analog signal in an optical signal form. The second output interface is configured to send the uplink analog signal in the optical signal form to the baseband processing apparatus 10.

It should be noted that examples in FIG. 2A and FIG. 2B are merely schematic diagrams of the structure of the baseband processing apparatus 10 and the structure of the radio frequency apparatus 20 in this embodiment of this application. Components included in the baseband processing apparatus 10 and the radio frequency apparatus 20 may be determined based on a requirement of an actual product, the examples in FIG. 2A and FIG. 2B are merely used for ease of understanding of this solution, and are not intended to limit this solution.

With reference to the foregoing descriptions, an embodiment of this application provides a signal processing method, which is applicable to a scenario in which a baseband processing apparatus and a radio frequency apparatus of a radio access device communicate with each other. Because there are two scenarios between the baseband processing apparatus and the radio frequency apparatus in a downlink direction and an uplink direction, communication procedures in the two scenarios are different. The following separately provides examples for the two applicable scenarios in the downlink direction and the uplink direction.

Figure 3:
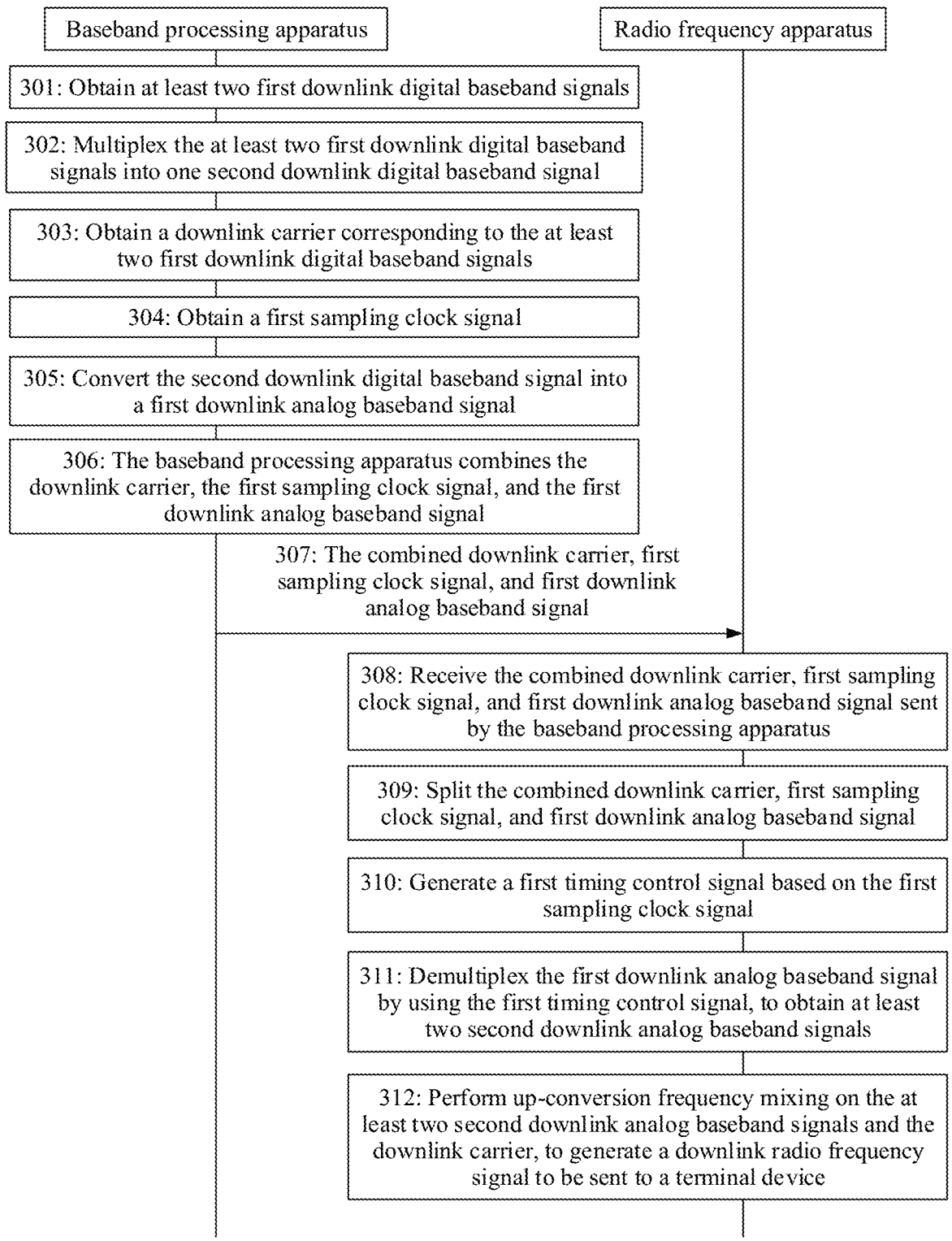
FIG. 3 is a schematic flowchart of a signal processing method according to an embodiment of this application.

1. The Baseband Processing Apparatus Communicates with the Radio Frequency Apparatus in the Downlink Direction Refer to FIG. 3. FIG. 3 is a schematic diagram of an interaction between the baseband processing apparatus and the radio frequency apparatus according to this embodiment of this application. An embodiment of the signal processing method provided in this embodiment of this application may include the following steps.

Step 301: The baseband processing apparatus obtains at least two first downlink digital baseband signals.

In some embodiments of this application, the baseband processing apparatus obtains the at least two first downlink digital baseband signals. Further, because one or more transmit channels may be set on the radio frequency apparatus, a baseband part of the baseband processing apparatus may generate the at least two first downlink digital baseband signals that need to be sent through the one or more transmit channels. The first downlink digital baseband signals may be independently generated by the baseband part of the baseband processing apparatus, or may be the at least two first downlink digital baseband signals generated by the baseband part based on downlink data that is sent by a network element in a core network and that is received by the baseband processing apparatus.

The first downlink digital baseband signal is a general concept, and indicates a digital baseband signal that is generated by the baseband part and is not multiplexed. Each first downlink digital baseband signal includes an in-phase (I) signal and a quadrature-phase (Q) signal. The at least two first downlink digital baseband signals carry user data, control data, other types of data, or the like.

Step 302: The baseband processing apparatus multiplexes the at least two first downlink digital baseband signals into one second downlink digital baseband signal.

In some embodiments of this application, a frequency generator and a downlink multiplexing timing control unit may be disposed in the baseband processing apparatus. The frequency generator is configured to produce a sampling clock signal. After the baseband processing apparatus obtains the at least two first downlink digital baseband signals, the downlink multiplexing timing control unit may generate a timing control signal based on the sampling clock signal generated by the frequency generator. Under control of the timing control signal, a multiplexing module of the baseband processing apparatus multiplexes the at least two first downlink digital baseband signals into the second downlink digital baseband signal.

Both the sampling clock signal and the timing control signal are represented as square wave signals, and are used to provide a time reference for the baseband processing apparatus to perform a sampling operation and a multiplexing operation. The sampling clock signal and the timing control signal may be square wave signals on a same frequency, or may be square wave signals on different frequencies. This is not limited herein. A difference between the sampling clock signal and the timing control signal lies in that the sampling clock signal is a square wave signal directly generated by the frequency generator, and the timing control signal is a square wave signal that needs to be generated based on the sampling clock signal and a specific application scenario. For example, the timing control signal may be represented as a third timing control signal used during sampling, a timing control signal used during multiplexing, or a fourth timing control signal used in another scenario. Timing control signals in different scenarios in different environments are usually represented as square wave signals on different frequencies. The second downlink digital baseband signal is also a general concept. A difference between the second downlink digital baseband signal and the first downlink digital baseband signal lies in that the second downlink digital baseband signal is a digital baseband signal obtained after multiplexing.

Further, after obtaining the at least two first downlink digital baseband signals, the baseband processing apparatus may sample each first downlink digital baseband signal. The third timing control signal (namely, a sampling frequency at which a sampling is performed) used when the baseband processing apparatus samples each first downlink digital baseband signal has an association relationship with a bandwidth of each first downlink digital baseband signal. For example, the at least two first downlink digital baseband signals include k first downlink digital baseband signals, and if a signal bandwidth of a k first downlink digital baseband signal is $d_k B$, a frequency (namely, the sampling frequency) of a generated timing control signal is $d_k \times mB$, where $d_k$ is a positive integer, B is a minimum system bandwidth, m is an integer, and a value of m meets a Nyquist sampling requirement.

After determining the bandwidth of each first downlink digital baseband signal, the baseband processing apparatus may determine a bandwidth of the second downlink digital baseband signal, and further generate, based on the sampling clock signal, the fourth timing control signal required during multiplexing. After the baseband processing apparatus samples each first downlink digital baseband signal under the control of the timing control signal, a plurality of first sampling signals may be obtained. The first sampling signal is also a general concept, and indicates a sampling signal obtained when the baseband processing apparatus samples the first downlink digital baseband signal. The baseband processing apparatus needs to determine an arrangement order of the plurality of first sampling signals obtained from the at least two first downlink digital baseband signals. That is, the baseband processing apparatus determines which first sampling signal in the first downlink digital baseband signal should be placed at each location of the second downlink digital baseband signal. Further, the plurality of first sampling signals may be multiplexed into the second downlink digital baseband signal under control of the fourth timing control signal.

A baseband processing apparatus side may store a sorting rule used when the plurality of first sampling signals are multiplexed, and sort the plurality of first sampling signals based on a frequency of a downlink carrier corresponding to each downlink digital baseband signal. A lower frequency of the downlink carrier indicates a higher sorting priority. For example, the at least two first downlink digital baseband signals include a first first downlink digital baseband signal and a second first downlink digital baseband signal. A downlink carrier corresponding to the first first downlink digital baseband signals is 1.8 gigahertz (GHz), and a bandwidth is 20 megahertz (MHz). n first sampling signals are obtained from the first first downlink digital baseband signal, where n is a positive integer, and the n first sampling signals include $a_1, a_2, a_3, \ldots a_n$. A downlink carrier corresponding to the second first downlink digital baseband signal is 4.8 GHz, and a bandwidth is 100 MHz. m first sampling signals are obtained from the second first downlink digital baseband signal, where m is a positive integer, and the m first sampling signals include $b_1, b_2, b_3, b_4, b_5, b_6, b_7, b_8, b_9, b_{10}, \ldots b_m$. A bandwidth of a multiplexed second downlink digital baseband signal is 120 MHz, and an arrangement order of a plurality of first sampling signals in the second downlink digital baseband signal may be $a_1, b_1, b_2, b_3, b_4, b_5, a_2, b_6, b_7, b_8, b_9, b_{10}, \ldots a_n, b_{m-4}, b_{m-3}, b_{m-2}, b_{m-1}, b_m$. A higher frequency of the downlink carrier corresponding to the downlink digital baseband signal may further indicates the higher sorting priority. Alternatively, sorting may be performed based on the bandwidth of each downlink digital baseband signal, and a higher bandwidth indicates the higher sorting priority. Alternatively, a lower bandwidth indicates the higher sorting priority, or the like. It should be understood that, the example herein is merely for ease of understanding of this solution. A specific representation form of the sorting rule should be flexibly determined based on an actual situation. This is not limited herein.

Further, a preset rule used when the plurality of sampling signals are sorted may be preset in the baseband processing apparatus and the radio frequency apparatus by a generation vendor, may be determined between the baseband processing apparatus and the radio frequency apparatus through negotiation in advance, may be configured for the baseband processing apparatus using manners such as system upgrade, or manual configuration in a process of using the baseband processing apparatus and the radio frequency apparatus, may be an update preset rule used to when the plurality of sampling signals are sorted in a process of using the baseband processing apparatus and the radio frequency apparatus, or the like. This is not further limited herein.

Step 303: The baseband processing apparatus obtains a downlink carrier corresponding to the at least two first downlink digital baseband signals.

In some embodiments of this application, the at least two first downlink digital baseband signals generated by the baseband processing apparatus need to be transmitted by the radio frequency apparatus trough at least one downlink carrier. The baseband processing apparatus may determine a downlink carrier that is on which frequency and that is used to transmit the at least two first downlink digital baseband signals. Because the frequency generator of the baseband processing apparatus is further configured to generate the downlink carrier, the baseband processing apparatus may obtain a downlink carrier of a corresponding frequency from the frequency generator.

A correspondence between the at least two first downlink digital baseband signals and the downlink carrier is many-to-one or many-to-many. For example, the at least two first downlink digital baseband signals include two signals, both the two signals are sent through a downlink carrier of 1.8 GHz, and the baseband processing apparatus may also obtain the downlink carrier from the frequency generator. In another example, the at least two first downlink digital baseband signals include three signals, the three signals are separately sent through downlink carriers of 1.8 GHz, 2.6 GHz, and 3.5 GHz, and the baseband processing apparatus needs to obtain the three downlink carriers from the frequency generator. It should be understood that, the foregoing examples are merely for ease of understanding of this solution, and are not intended to limit this solution.

Step 304: The baseband processing apparatus obtains a first sampling clock signal.

In some embodiments of this application, the baseband processing apparatus obtains the first sampling clock signal generated by the frequency generator. The first sampling clock signal may also be a general concept, and indicates a sampling clock signal that is sent to the radio frequency apparatus and that is in the sampling clock signal generated by the frequency generator. Further, there may be a preset relationship between a frequency value of the first sampling clock signal and a bandwidth value of a first downlink analog baseband signal (or a bandwidth value of the second downlink digital baseband signal). For example, the frequency value of the first sampling clock signal may be 1.5 times, 1.8 times, 2 times higher than the bandwidth value of the first downlink analog baseband signal, or there may be another preset relationship between the frequency value of the first sampling clock signal and the bandwidth value of the first downlink analog baseband signal.

Optionally, the preset relationship between the frequency value of the first sampling clock signal and the bandwidth value of the first downlink analog baseband signal may be preset in the baseband processing apparatus and the radio frequency apparatus by the generation vendor, may be determined between the baseband processing apparatus and the radio frequency apparatus through negotiation in advance, may be configured for the baseband processing apparatus using the manners such as the system upgrade, or the manual configuration in the process of using the baseband processing apparatus and the radio frequency apparatus, may be an update preset relationship between the frequency value of the first sampling clock signal and the bandwidth value of the second downlink digital baseband signal in the process of using the baseband processing apparatus and the radio frequency apparatus, or the like. This is not limited herein.

It should be understood that an execution sequence of step 303 and step 304 is not limited in this embodiment of this application. Step 303 may be performed before step 304, step 304 may be performed before step 303, or step 303 and step 304 may be simultaneously performed.

Step 305: The baseband processing apparatus converts the second downlink digital baseband signal into the first downlink analog baseband signal.

In some embodiments of this application, after the baseband processing apparatus performs step 302, namely, after the baseband processing apparatus obtains the second downlink digital baseband signal, the baseband processing apparatus may convert the second downlink digital baseband signal into one first downlink analog baseband signal using one DAC.

It should be understood that an execution sequence of step 305, and steps 303 and 304 is not limited in this embodiment of this application. Steps 303 and 304 may be performed before step 305, step 305 may be performed before steps 303 and 304, or step 305 and steps 303 and 304 may be simultaneously performed.

Step 306: The baseband processing apparatus combines the downlink carrier, the first sampling clock signal, and the first downlink analog baseband signal.

In some embodiments of this application, the baseband processing apparatus may combine the obtained at least one downlink carrier, first sampling clock signal, and first downlink analog baseband signal using a combiner.

It should be noted that step 303 is an optional step. If step 303 is not performed and only step 304 is performed, step 306 may include that the baseband processing apparatus combines the first sampling clock signal and the first downlink analog baseband signal. Further, the baseband processing apparatus combines the first sampling clock signal and the first downlink analog baseband signal using a combiner.

Figure 4:
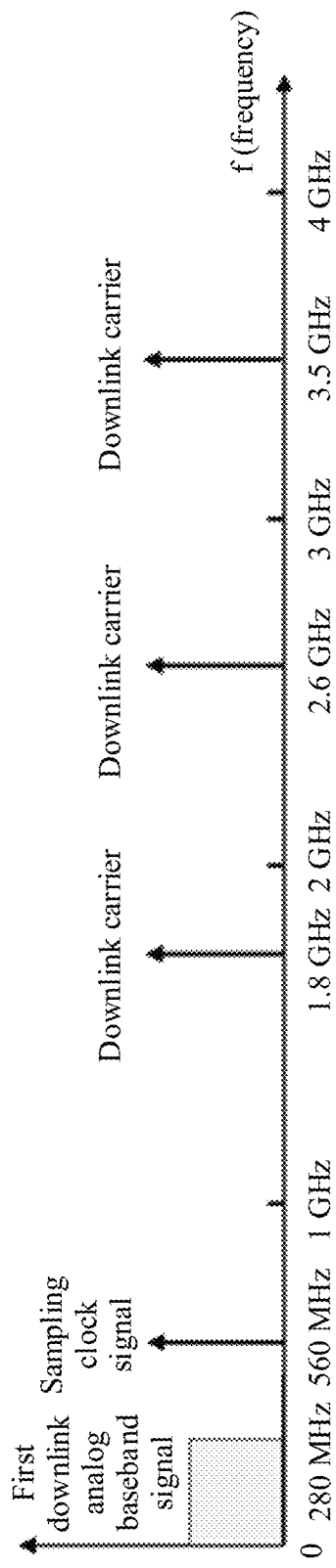
FIG. 4 is a schematic diagram of a spectrum of a combined signal in a signal processing method according to an embodiment of this application.

For further understanding of this solution, refer to FIG. 4. FIG. 4 is a schematic diagram of a spectrum of a combined signal obtained after combining the downlink carrier, the first sampling clock signal, and the first downlink analog baseband signal according to this embodiment of this application. In FIG. 4, an example in which the baseband processing apparatus simultaneously performs step 303 and step 304 is used. As shown in FIG. 4, the bandwidth value of the first downlink analog baseband signal is 280 MHz, a location occupied by the first downlink analog baseband signal on the spectrum is 0-280 MHz, a location of the first sampling clock signal on the spectrum is 560 MHz, locations of the three downlink carriers on the spectrum are respectively 1.8 GHz, 2.6 GHz, and 3.5 GHz. It should be understood that, the example in FIG. 4 is merely for ease of understanding this solution, and is not intended to limit this solution.

Step 307: The baseband processing apparatus sends the combined downlink carrier, first sampling clock signal, and first downlink analog baseband signal to the radio frequency apparatus.

In some embodiments of this application, the baseband processing apparatus may convert, using an electrical-to-optical converter, a combined signal that is in an electrical signal form and that is obtained in step 306 into a combined signal in an optical signal form, and transmit the combined signal in the optical signal form to the radio frequency apparatus through an optical fiber between the baseband processing apparatus and the radio frequency apparatus. The electrical-to-optical converter may be represented as a semiconductor laser, another component, or the like. Further, if steps 303 and 304 are simultaneously performed, the combined signal on which electrical-to-optical conversion needs to be performed is the combined first downlink analog baseband signal, at least one downlink carrier, and first sampling clock signal in the electrical signal form. If step 303 is not performed and only step 304 is performed, the combined signal on which the electrical-to-optical conversion needs to be performed is a combined first downlink analog baseband signal and first sampling clock signal in an electrical signal form. It should be noted that step 306 is an optional step. If step 306 is not performed, the baseband processing apparatus may separately convert the first downlink analog baseband signal, the at least one downlink carrier, and/or the first sampling clock signal into an optical signal, and then separately transmit the optical signal through the optical fiber.

Step 308: The radio frequency apparatus receives the combined downlink carrier, first sampling clock signal, and first downlink analog baseband signal sent by the baseband processing apparatus.

In some embodiments of this application, after receiving, through the optical fiber between the baseband processing apparatus and the radio frequency apparatus, the combined downlink carrier, first sampling clock signal, and first downlink analog baseband signal sent by the baseband processing apparatus, the radio frequency apparatus needs to convert the combined signal in an optical signal form into a combined signal in an electrical signal form using an optical-to-electrical converter on the radio frequency apparatus. The optical-to-electrical converter may be represented as a component such as an optoelectronic detector.

Correspondingly, if step 303 is not performed and only steps 304 and 306 are performed, step 308 may include that the radio frequency apparatus receives, through the optical fiber, the combined first sampling clock signal, and first downlink analog baseband signal that is sent by the baseband processing apparatus and that is in an optical signal form, and converts the combined first sampling clock signal and first downlink analog baseband signal into an electrical signal form using the optical-to-electrical converter. If step 306 is not performed and only steps 303 and 304 are performed, the radio frequency apparatus separately converts the received first downlink analog baseband signal, at least one downlink carrier, and/or first sampling clock signal in an optical signal form into an electrical signal form.

Step 309: The radio frequency apparatus splits the combined downlink carrier, first sampling clock signal, and first downlink analog baseband signal.

In some embodiments of this application, after obtaining the combined signal in the electrical signal form, the radio frequency apparatus may split the combined downlink carrier, first sampling clock signal, and first downlink analog baseband signal using the splitter. Correspondingly, if step 303 is not performed and only steps 304 and 306 are performed, step 309 may include that the radio frequency apparatus splits the combined sampling clock signal and first downlink analog baseband signal. If step 306 is not performed, step 309 does not need to be performed either.

The radio frequency apparatus may implement the foregoing splitting operation using a plurality of filters. Further, the radio frequency apparatus may obtain the first downlink analog baseband signal using an LPF, and the radio frequency apparatus may also obtain the at least one downlink carrier and the first sampling clock signal using a plurality of narrowband band-pass filters. Further, there is a correspondence between a frequency of an electric wave that can pass through each of the plurality of narrowband band-pass filters and frequencies of the downlink carrier and the first sampling clock signal. For example, still refer to FIG. 4. In FIG. 4, an example in which the combined signal includes the downlink carrier, the first sampling clock signal, and the first downlink analog baseband signal is used for description. A location of the first sampling clock signal on the spectrum is 560 MHz, and locations of the three downlink carriers on the spectrum are respectively 1.8 GHz, 2.6 GHz, and 3.5 GHz. Therefore, a narrowband band-pass filter of 560 MHz, a narrowband band-pass filter of 1.8 GHz, a narrowband band-pass filter of 2.6 GHz, and a narrowband band-pass filter of 3.5 GHz may be separately used to filter the combined signal, to obtain one first sampling clock signal and three downlink carriers. It should be understood that, the foregoing example is merely for ease of understanding of this solution, and is not intended to limit this solution.

Optionally, if the radio frequency apparatus prestores the preset relationship between the frequency value of the first sampling clock signal and the bandwidth value of the first downlink analog baseband signal, after determining the first downlink analog baseband signal, the radio frequency apparatus may determine the frequency value of the first sampling clock signal such that the first sampling clock signal may be obtained using a narrowband band-pass filter on a corresponding frequency.

Further, the narrowband band-pass filter may be represented as a surface acoustic wave component, a bulk acoustic wave component, another type of component having a filtering function, or the like.

Step 310: The radio frequency apparatus generates a first timing control signal based on the first sampling clock signal.

In some embodiments of this application, after obtaining the first sampling clock signal and the first downlink analog baseband signal, the radio frequency apparatus may determine a bandwidth of the first downlink analog baseband signal, and then may generate the first timing control signal based on the first sampling clock signal and the bandwidth of the first downlink analog baseband signal. The first timing control signal is used to control a sampling frequency during the radio frequency apparatus performs the demultiplexing operation, and a relationship between a frequency value of the first timing control signal and the frequency value of the first downlink analog baseband signal meets the Nyquist sampling requirement. In this embodiment of this application, the baseband processing apparatus sends the first sampling clock signal to the radio frequency apparatus in a combination manner. The radio frequency apparatus may separate the first sampling clock signal from the combined signal using the splitter. This ensures the same first sampling clock signal is used between the baseband processing apparatus and the radio frequency apparatus, and feasibility of this solution is improved with a simple and convenient operation.

Step 311: The radio frequency apparatus demultiplexes the first downlink analog baseband signal using the first timing control signal, to obtain at least two second downlink analog baseband signals.

In some embodiments of this application, a downlink demultiplexing multiplexer switch in the radio frequency apparatus may demultiplex the first downlink analog baseband signal in a sampling form under the control of the first timing control signal, to obtain a plurality of second sampling signals. The second sampling signal may also be a general concept, and the second sampling signal indicates a signal obtained when the radio frequency apparatus samples the first downlink analog baseband signal. Because the radio frequency apparatus may store the sorting rule used when the plurality of first sampling signals are multiplexed, the radio frequency apparatus may separately obtain, based on the sorting rule used when the plurality of first sampling signals are multiplexed, from the plurality of second sampling signals, a sampling signal corresponding to each of the at least two second downlink analog baseband signals.

Figure 5B:
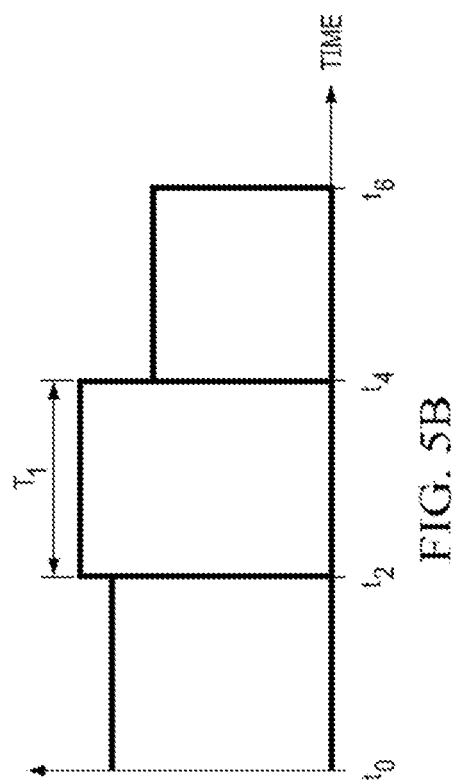
FIG. 5A and FIG. 5B are schematic diagrams of performing sampling and holding by a sample hold device in a signal processing method according to an embodiment of this application.
Figure 5A:
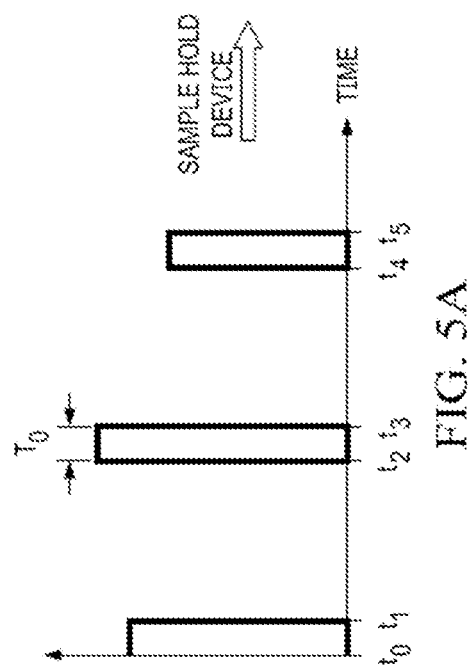

Because a frequency of the first timing control signal is comparatively high, a time when the demultiplexing multiplexer switch samples each second sampling signal is very short. Therefore, each second sampling signal needs to be kept for a long enough time using a sample hold (i.e., sampling/holding (S/H)) device. Further, the radio frequency apparatus may further generate a fifth timing control signal based on the first sampling clock signal, and the sample hold device performs, under control of the fifth timing control signal, sampling and holding on each second sampling signal included in each second downlink analog baseband signal. For further understanding of this solution, refer to FIG. 5A and FIG. 5B. FIG. 5A and FIG. 5B are a schematic diagrams of performing the sampling and holding by the sample hold device in the signal processing method according to this embodiment of this application. FIG. 5 includes two schematic diagrams FIG. 5A and FIG. 5B. FIG. 5A shows a displaying manner of three second sampling signals in one second downlink analog baseband signal obtained after the demultiplexing multiplexer switch samples the first downlink analog baseband signal. FIG. 5B shows a displaying manner of three second sampling signals in one second downlink analog baseband signal that passes through the sample hold device, where a value of $T_1$ is greater than a value of $T_0$.

Optionally, as shown in FIG. 5A and FIG. 5B, because each second downlink analog baseband signal that passes through the sample hold device is a signal in an echelon form rather than a smooth signal, the radio frequency apparatus may filter out a high-frequency component in the second downlink analog baseband signal in the echelon form using the LPF, to obtain a smooth second downlink analog baseband signal.

Step 312: The radio frequency apparatus performs up-conversion frequency mixing on the at least two second downlink analog baseband signals and the downlink carrier, to generate a downlink radio frequency signal to be sent to a terminal device.

In some embodiments of this application, after obtaining the at least two second downlink analog baseband signals, the radio frequency apparatus may determine a correspondence between the at least two second downlink analog baseband signals and at least one downlink carrier, and further perform the up-conversion frequency mixing on each second downlink analog baseband signal and a corresponding downlink carrier, to generate at least two downlink radio frequency signals to be sent to the terminal device. After power amplification is performed using a power amplifier (PA), at least two downlink radio frequency signals are sent to the terminal device through an antenna. For example, the radio frequency apparatus obtains a first second downlink analog baseband signal, a second second downlink analog baseband signal, a third second downlink analog baseband signal, and three downlink carriers, the three downlink carriers are respectively a downlink carrier of 1.8 GHz, a downlink carrier of 2.6 GHz, and a downlink carrier of 3.5 GHz, and the first second downlink analog baseband signal corresponds to the downlink carrier of 1.8 GHz, the second second downlink analog baseband signal corresponds to the downlink carrier of 2.6 GHz, and the third second downlink analog baseband signal corresponds to the downlink carrier of 3.5 GHz. The radio frequency apparatus performs the up-conversion frequency mixing on the first second downlink analog baseband signal and the downlink carrier of 1.8 GHz, performs the up-conversion frequency mixing on the second second downlink analog baseband signal and the downlink carrier of 2.6 GHz, performs the up-conversion frequency mixing on the third second downlink analog baseband signal and the downlink carrier of 3.5 GHz, and the like. It should be understood that, the foregoing example is merely for ease of understanding of this solution, and is not intended to limit this solution.

In this embodiment of this application, the baseband processing apparatus produces the downlink carrier, and the radio frequency apparatus may directly perform the up-conversion frequency mixing using the downlink carrier sent by the baseband processing apparatus. In a scenario in which one baseband processing apparatus simultaneously communicates with a plurality of radio frequency apparatuses, because all downlink carriers used in the plurality of radio frequency apparatuses are downlink carriers generated by the same baseband processing apparatus, frequency deviation between the plurality of radio frequency apparatuses is avoided, and a distributed MIMO function formed by the plurality of radio frequency apparatuses is implemented in the downlink direction.

It should be noted that if step 303 is not performed, the radio frequency apparatus cannot obtain the downlink carrier from the baseband processing apparatus, and the radio frequency apparatus may produce a downlink carrier using a local oscillator.

In this embodiment of this application, after obtaining the downlink digital signal, the baseband processing apparatus first converts the downlink digital baseband signal into the downlink analog baseband signal, and sends the downlink analog baseband signal to the radio frequency apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

Figure 6:
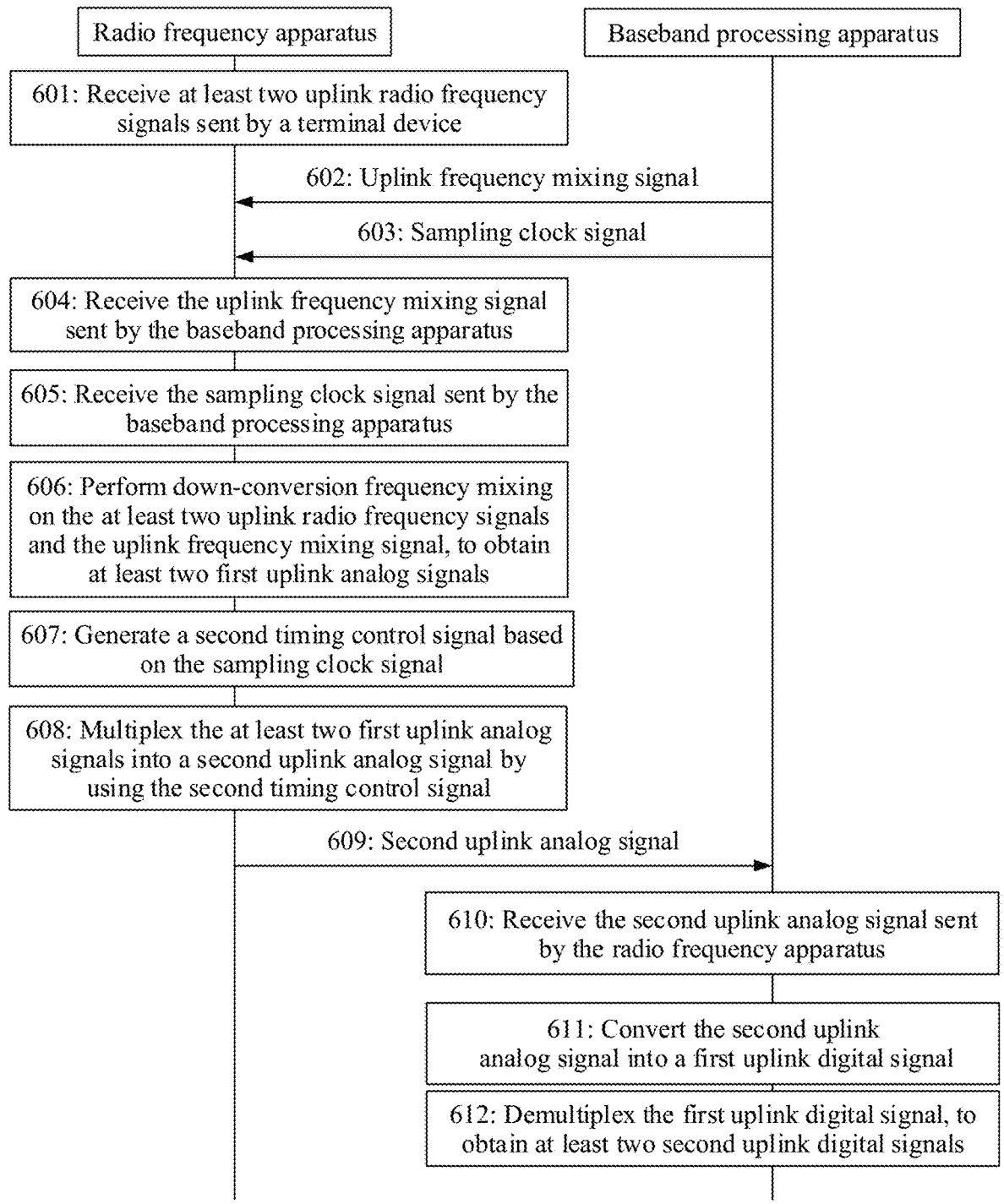
FIG. 6 is another schematic flowchart of a signal processing method according to an embodiment of this application.

2. The Baseband Processing Apparatus Communicates with the Radio Frequency Apparatus in the Uplink Direction The foregoing describes a working procedure of the signal processing method provided in this embodiment of this application in the downlink direction. Based on the plurality of embodiments corresponding to FIG. 3, the following describes, with reference to the accompanying drawings, a working procedure of the signal processing method provided in this embodiment of this application in the uplink direction. Refer to FIG. 6. FIG. 6 is a schematic diagram of another interaction between the baseband processing apparatus and the radio frequency apparatus according to this embodiment of this application. Another embodiment of the signal processing method provided in this embodiment of this application may include the following steps.

Step 601: The radio frequency apparatus receives at least two uplink radio frequency signals sent by a terminal device.

In some embodiments of this application, the radio frequency apparatus may receive, using an antenna, the at least two uplink radio frequency signals sent by the terminal device, and amplify each received uplink radio frequency signal using an LNA. The uplink radio frequency signal may carry control data or user data.

Step 602: The baseband processing apparatus sends an uplink frequency mixing signal to the radio frequency apparatus.

In some embodiments of this application, because the baseband processing apparatus is responsible for allocating uplink and downlink time-frequency resources, the baseband processing apparatus may learn of a frequency value of an uplink carrier used by the at least two uplink radio frequency signals, and may further determine at least one uplink frequency mixing signal corresponding to the at least two uplink radio frequency signals. The uplink frequency mixing signal is used by the radio frequency apparatus to perform down-conversion frequency mixing on the at least two uplink radio frequency signals and the uplink frequency mixing signal. A quantity of uplink frequency mixing signals and a frequency value of the uplink frequency mixing signal each have a correspondence with a frequency of the carrier used by the at least two uplink radio frequency signals. If the at least two uplink radio frequency signals work at carriers on a same frequency, the uplink frequency mixing signal may be one signal. If the at least two uplink radio frequency signals work at carriers on different frequencies, the uplink frequency mixing signal may be a plurality of signals.

Further, in an implementation, step 602 may be represented as the baseband processing apparatus obtains at least one uplink frequency mixing signal in an electrical signal form from a frequency generator, converts the at least one uplink frequency mixing signal in the electrical signal form into at least one uplink frequency mixing signal in an optical signal form using an electrical-to-optical converter, and then sends the at least one uplink frequency mixing signal in the optical signal form to the radio frequency apparatus through an optical fiber between the baseband processing apparatus and the radio frequency apparatus.

In another implementation, the baseband processing apparatus may send the uplink frequency mixing signal to the radio frequency apparatus while sending a downlink carrier. Further, because a communication manner used for each uplink radio frequency signal may be TDD, or FDD. In one case, a communication manner used for a target uplink radio frequency signal in the at least two uplink radio frequency signals is the FDD, for the uplink radio frequency signal (or a downlink analog baseband signal) working at the carrier on the same frequency, the uplink frequency mixing signal and the downlink carrier are represented as different square wave signals. Step 602 may be implemented using step 306 and step 307 in the embodiment shown in FIG. 3. After obtaining the at least one uplink frequency mixing signal in the electrical signal form from the frequency generator, the baseband processing apparatus combines at least one downlink carrier, the at least one uplink frequency mixing signal, a first sampling clock signal, and a first downlink analog baseband signal, and sends combined at least one downlink carrier, uplink frequency mixing signal, first sampling clock signal, and first downlink analog baseband signal to the radio frequency apparatus. In another case, a communication manner used for a target uplink radio frequency signal in the at least two uplink radio frequency signals is the TDD, for the uplink radio frequency signal (or a downlink analog baseband signal) working at the carrier on the same frequency, the uplink frequency mixing signal and the downlink carrier may be represented as a same square wave signal. Because the uplink frequency mixing signal and the downlink carrier may be represented as the same square wave signal, step 602 may also be implemented using step 303, step 306, and step 307 in the embodiment shown in FIG. 3. For a specific implementation process, refer to the description in FIG. 3. Details are not described herein one by one again.

Step 603: The baseband processing apparatus sends a second sampling clock signal to the radio frequency apparatus.

In this embodiment of this application, the second sampling clock signal is a general concept, and indicates a sampling clock signal obtained by the radio frequency apparatus for implementing an operation in the uplink direction. The second sampling clock signal and the first sampling clock signal may be physically represented as a same signal, or may be represented as different signals. This is not limited herein.

In an implementation, the baseband processing apparatus may obtain the second sampling clock signal from the frequency generator, convert a second sampling clock signal in an electrical signal form into a second sampling clock signal in an optical signal form using the electrical-to-optical converter, and then send the second sampling clock signal in the optical signal form to the radio frequency apparatus through the optical fiber between the baseband processing apparatus and the radio frequency apparatus.

In another implementation, step 603 and step 602 may be implemented using a same step. Further, in one case, the baseband processing apparatus may send a second sampling clock signal to the radio frequency apparatus while sending a downlink carrier. That is, step 603 and step 602 may be implemented using step 303, step 306, and step 307 in the embodiment shown in FIG. 3. For a specific implementation process, refer to the description in FIG. 3. Details are not described herein one by one again. In another case, step 603 and step 602 may be represented as the baseband processing apparatus may combine an uplink frequency mixing signal and a second sampling clock signal using a combiner, and send combined uplink frequency mixing signal and second sampling clock signal to the radio frequency apparatus.

It should be understood that an execution sequence of step 602 and step 603 is not limited in this embodiment of this application. Step 602 may be performed before step 603, step 603 may be performed before step 602, or steps 602 and 603 may be simultaneously performed.

Step 604: The radio frequency apparatus receives the uplink frequency mixing signal sent by the baseband processing apparatus.

Correspondingly, in an implementation, step 603 may include that the radio frequency apparatus receives, through the optical fiber between the baseband processing apparatus and the radio frequency apparatus, the at least one uplink frequency mixing signal sent by the baseband processing apparatus, and converts, using an optical-to-electrical converter in the radio frequency apparatus, the at least one uplink frequency mixing signal in the optical signal form into at least one uplink frequency mixing signal in an electrical signal form.

In another implementation, if the communication manner used for the target uplink radio frequency signal in the at least two uplink radio frequency signals is the FDD, a specific implementation of step 603 is similar to implementations of steps 308 and 309. The radio frequency apparatus receives combined at least one downlink carrier, at least one uplink frequency mixing signal, first second sampling clock signal, and first downlink analog baseband signal sent by the baseband processing apparatus, and splits the combined at least one downlink carrier, at least one uplink frequency mixing signal, first second sampling clock signal, and first downlink analog baseband signal. For a specific implementation, refer to descriptions in step 308 and step 309 in the embodiment corresponding to FIG. 3. Details are not described herein again.

In another implementation, if the communication manner used for the target uplink radio frequency signal in the at least two uplink radio frequency signals is the TDD, step 603 may be implemented using steps 308 and 309. The radio frequency apparatus may select, from at least one downlink carrier obtained through splitting, one downlink carrier corresponding to the target uplink radio frequency signal, and consider the downlink carrier as an uplink frequency mixing signal corresponding to the target uplink radio frequency signal.

It should be understood that both steps 602 and 604 are optional steps. If there are not steps 602 and 604, the radio frequency apparatus may also generate, using a local oscillator, at least one uplink frequency mixing signal corresponding to the at least two uplink radio frequency signals.

Step 605: The radio frequency apparatus receives the second sampling clock signal sent by the baseband processing apparatus.

Correspondingly, in an implementation, the radio frequency apparatus may receive, through the optical fiber between the baseband processing apparatus and the radio frequency apparatus, the second sampling clock signal sent by the baseband processing apparatus, and convert the second sampling clock signal in the optical signal form into the second sampling clock signal in the electrical signal form using the optical-to-electrical converter.

In another implementation, if step 603 and step 602 are implemented using the same step, step 604 and step 605 may be implemented using a same step. Further, in a case, if step 603 and step 602 are implemented using step 303, step 306, and step 307 in the embodiment shown in FIG. 3, step 603 and step 602 may be implemented using step 308 and step 309 in the embodiment shown in FIG. 3. For a specific implementation process, refer to the description in FIG. 3.

Details are not described herein one by one again. In another case, step 604 and step 605 may further be represented as The radio frequency apparatus receives the combined uplink frequency mixing signal and second sampling clock signal sent by the baseband processing apparatus, and splits the combined uplink frequency mixing signal and second sampling clock signal using a splitter, to obtain the at least one uplink frequency mixing signal and the second sampling clock signal. In this embodiment of this application, the baseband processing apparatus may send a sampling clock signal in an analog signal form to the radio frequency apparatus. After obtaining the sampling clock signal, the radio frequency apparatus does not need to perform digital to analog conversion on the sampling clock signal, and can directly use a sampling clock signal after optical-to-electrical conversion, which alleviates work load of the radio frequency apparatus and improves efficiency in the signal processing process. In addition, when performing the operation in the uplink direction, the radio frequency apparatus may multiplex the sampling clock signal obtained in a downlink direction, which reduces a communication resource between the baseband processing apparatus and the radio frequency apparatus.

It should be understood that an execution sequence of step 604 and step 605 is not limited in this embodiment of this application. Step 604 may be performed before step 605, step 605 may be performed before step 604, or steps 604 and 605 may be simultaneously performed.

Step 606: The radio frequency apparatus performs the down-conversion frequency mixing on the at least two uplink radio frequency signals and the uplink frequency mixing signal, to obtain at least two first uplink analog signals.

In some embodiments of this application, after the radio frequency apparatus obtains the at least one uplink frequency mixing signal in step 604, a down-converter of the radio frequency apparatus may be used to perform the down-conversion frequency mixing on each of the at least two uplink radio frequency signals and the corresponding uplink frequency mixing signal, to obtain the at least two first uplink analog signals. The first uplink analog signal is a general concept, and indicates a signal obtained after the down-conversion frequency mixing is performed on the uplink radio frequency signal. For example, the radio frequency apparatus receives a first uplink radio frequency signal, a second uplink radio frequency signal, and a third uplink radio frequency signal, and three uplink frequency mixing signals, the three uplink frequency mixing signals are respectively an uplink frequency mixing signal of 1.8 GHz, an uplink frequency mixing signal of 2.4 GHz, and an uplink frequency mixing signal of 3.5 GHz, and the first uplink radio frequency signal corresponds to the uplink frequency mixing signal of 1.8 GHz, the second uplink radio frequency signal corresponds to the uplink frequency mixing signal of 2.4 GHz, and the third uplink radio frequency signal corresponds to the uplink frequency mixing signal of 3.5 GHz. The radio frequency apparatus performs the up-conversion frequency mixing on the first uplink radio frequency signal and the uplink frequency mixing signal of 1.8 GHz, performs the up-conversion frequency mixing on the second uplink radio frequency signal and the uplink frequency mixing signal of 2.4 GHz, performs the up-conversion frequency mixing on the third uplink radio frequency signal and the uplink frequency mixing signal of 3.5 GHz, and the like. It should be understood that, the foregoing example is merely for ease of understanding of this solution, and is not intended to limit this solution.

In this embodiment of this application, the baseband processing apparatus produces the uplink frequency mixing signal, and the radio frequency apparatus may directly perform the down-conversion frequency mixing using the uplink frequency mixing signal sent by the baseband processing apparatus. In a scenario in which one baseband processing apparatus simultaneously communicates with a plurality of radio frequency apparatuses, because all uplink frequency mixing signals used in the plurality of radio frequency apparatuses are uplink frequency mixing signals generated by a same baseband processing apparatus, frequency deviation between the plurality of radio frequency apparatuses is avoided, and a distributed MIMO function formed by the plurality of radio frequency apparatuses is implemented in the uplink direction.

Step 607: The radio frequency apparatus generates a second timing control signal based on the second sampling clock signal.

In some embodiments of this application, after obtaining the at least two first uplink analog signals, the radio frequency apparatus may determine a bandwidth of each first uplink analog signal and a bandwidth of a multiplexed second uplink analog signal, and further generate the second timing control signal and a sixth timing control signal based on the bandwidth of each first uplink analog signal, the bandwidth of the second uplink analog signal, and the obtained second sampling clock signal. The second timing control signal indicates a timing control signal used during multiplexing, and the sixth timing control signal indicates a timing control signal used during sampling.

Step 608: The radio frequency apparatus multiplexes the at least two first uplink analog signals into the second uplink analog signal using the second timing control signal.

In some embodiments of this application, a sample hold device of the radio frequency apparatus may separately sample each first uplink analog signal under control of at least one sixth timing control signal, to obtain a plurality of third sampling signals. A relationship between a frequency value of each sixth timing control signal and a frequency value of each first uplink analog signal meets a Nyquist sampling requirement, and a relationship between a frequency value of the second timing control signal and a total bandwidth value of the at least two first uplink analog signals meets the Nyquist sampling requirement. Then, a multiplexing multiplexer switch of the radio frequency apparatus may multiplex, under control of the second timing control signal, the plurality of third sampling signals output by the sample hold device. A sorting rule for multiplexing the plurality of third sampling signals may be similar to a sorting rule for multiplexing a plurality of first sampling signals. For details, refer to the description in the embodiment corresponding to FIG. 3. Details are not described herein again.

Step 609: The radio frequency apparatus sends the second uplink analog signal to the baseband processing apparatus.

In some embodiments of this application, after generating the second uplink analog signal, the radio frequency apparatus may convert a second uplink analog signal in an electrical signal form into a second uplink analog signal in an optical signal form using the electrical-to-optical converter, and send the second uplink analog signal in the optical signal form to the baseband processing apparatus through the optical fiber between the radio frequency apparatus and the baseband processing apparatus.

Step 610: The baseband processing apparatus receives the second uplink analog signal sent by the radio frequency apparatus.

In some embodiments of this application, the baseband processing apparatus may receive, through the optical fiber, the second uplink analog signal that is in the optical signal form and that is sent by the radio frequency apparatus, and convert the second uplink analog signal in the optical signal form into the second uplink analog signal in the electrical signal form using the optical-to-electrical converter.

Step 611: The baseband processing apparatus converts the second uplink analog signal into a first uplink digital signal.

In some embodiments of this application, the baseband processing apparatus may convert the second uplink analog signal into the first uplink digital signal using the ADC. Further, an uplink demultiplexing timing control unit of the baseband processing apparatus may generate a seventh timing control signal based on the sampling clock signal generated by the frequency generator, the ADC samples and digitizes the second uplink analog signal under control of the seventh timing control signal, to obtain the first uplink digital signal.

Step 612: The baseband processing apparatus demultiplexes the first uplink digital signal, to obtain at least two second uplink digital signals.

In some embodiments of this application, after the baseband processing apparatus obtains the first uplink digital signal, a demultiplexing module of the baseband processing apparatus may demultiplex the first uplink digital signal according to the sorting rule used when the radio frequency apparatus multiplexes the plurality of third sampling signals, to obtain the at least two second uplink digital signals. Further, a baseband part may process data on the at least two second uplink digital signals. Further, the uplink demultiplexing timing control unit may further generate an eighth timing control signal based on the sampling clock signal generated by the frequency generator, and the demultiplexing module performs a demultiplexing operation under control of the eighth timing control signal.

In this embodiment of this application, after obtaining the at least two uplink radio frequency signals, the radio frequency apparatus first performs the down-conversion, to obtain the at least two first uplink analog signals, and after multiplexing the at least two first uplink analog signals into one second uplink analog signal, the radio frequency apparatus then directly sends the second uplink analog signal to the baseband processing apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

The following uses a specific embodiment to describe in detail a signal processing method provided in an embodiment of this application. In this embodiment, for example, there are carriers working on three frequencies: 1.5 GHz (a communication manner is TDD), 1.8 GHz (a communication manner is FDD), and 2.6 GHz (a communication manner is the TDD). The carriers respectively correspond to one antenna, two antennas, and two antennas. Bandwidths corresponding to the carriers are respectively 20 MHz, 40 MHz, and 60 MHz, and sampling frequencies are respectively 40 MHz, 80 MHz, and 120 MHz. Correspondingly, a BBU needs to separately generate three third timing control signals of 40 MHz, 80 MHz, and 120 MHz based on a sampling clock signal generated by a frequency generator.

The BBU obtains a total of six first downlink digital baseband signals, and within a same sampling time, sequences formed by first sampling signals that are generated by a baseband part of the BBU based on the six first downlink digital baseband signals are respectively:

Signal 1 (1.5 GHz, TDD, 20 MHz): $c_0, c_1, \ldots$.

Antenna 1 for signal 2 (1.8 GHz, FDD, 40 MHz): $d_0^1, d_1^1, d_1^2, d_1^3, \ldots$.

Antenna 2 for signal 2 (1.8 GHz, FDD, 40 MHz): $d_0^2, d_1^2, d_2^2, d_3^2, \ldots$.

Antenna 1 for signal 3 (2.6 GHz, TDD, 60 MHz): $e_0^1, e_1^1, e_2^1, e_3^1, e_4^1, e_5^1, \ldots$.

Antenna 2 for signal 3 (2.6 GHz, TDD, 60 MHz): $e_0^2, e_1^2, e_2^2, e_3^2, e_4^2, e_5^2, \ldots$.

A downlink multiplexing timing control unit of the BBU may generate a fourth timing control signal of 440 MHz based on the sampling clock signal produced by the frequency generator, and the baseband part that controls the BBU multiplexes the plurality of first sampling signals. In second downlink digital baseband signals obtained after time division multiplexing is performed on the first sampling signal, for example, a sorting rule in which a lower frequency of a corresponding downlink carrier indicates a higher sorting priority is used, a sequence formed by the first sampling signals may be:

$c_0, d_0^1, d_1^1, d_0^2, d_1^2, e_0^1, e_1^1, e_2^1, e_0^2, e_1^2, e_2^2, c_1, d_2^1, d_3^1, d_2^2, d_3^2, e_3^1, e_4^1, e_5^1, e_3^2, e_4^2, e_5^2, \ldots$.

Certainly, another sorting rule may also be used in the first sampling signal in the second downlink digital baseband signal. For example, the sequence formed by the first sampling signal may also be:

$c_0, d_0^1, d_1^1, e_0^1, e_1^1, e_2^1, d_0^2, d_1^2, e_0^2, e_1^2, e_2^2, c_1, d_2^1, d_3^1, e_3^1, e_4^1, e_5^1, d_2^2, d_3^2, e_3^2, e_4^2, e_5^2, \ldots$.

After obtaining the second downlink digital baseband signal, the BBU may convert the second downlink digital baseband signal into a first downlink analog baseband signal using one DAC. A bandwidth of the first downlink analog baseband signal is 220 MHz, a timing control signal used in a process in which the DAC performs digital to analog conversion is also generated based on the sampling clock signal generated by the frequency generator.

Figure 7:
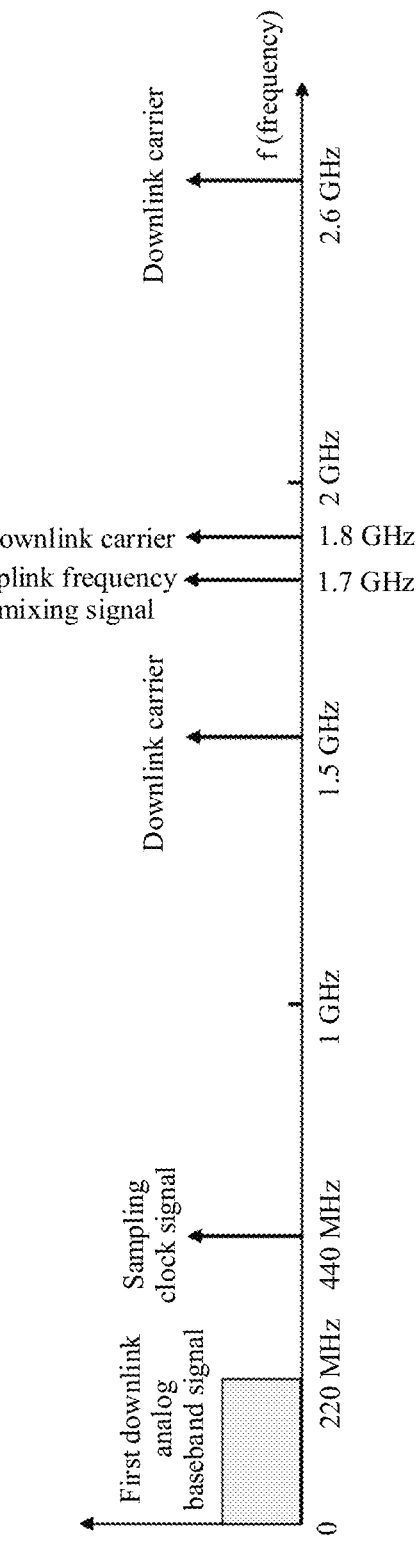
FIG. 7 is a schematic diagram of another spectrum of a combined signal in a signal processing method according to an embodiment of this application.

Optionally, the BBU may further obtain a first sampling clock signal, three downlink carriers, and one uplink frequency mixing signal from the frequency generator, and combine the first downlink analog baseband signal, the first sampling clock signal, the three downlink carriers, and the uplink frequency mixing signal into one combined signal using a combiner. Refer to FIG. 7. FIG. 7 is a schematic diagram of another spectrum of a combined signal in the signal processing method according to this embodiment of this application. In FIG. 7, an example in which a frequency value of the first sampling clock signal may be twice a bandwidth value of the first downlink analog baseband signal is used for description. The bandwidth of the first downlink analog baseband signal is 220 MHz, the first sampling clock signal is transmitted on a frequency of 440 MHz, and a first downlink carrier and a third downlink carrier (namely, the uplink frequency mixing signals) are transmitted on frequencies of 1.5 GHz and 2.6 GHz. Because the communication manner of the carrier 2 is the FDD, the second downlink carrier and the uplink frequency mixing signal are different. Therefore, the uplink frequency mixing signal and the downlink carrier are separately transmitted on frequencies 1.7 GHz and 1.8 GHz.

The BBU may convert a combined signal in an electrical signal form into a combined signal in an optical signal form using an electrical-to-optical converter, and transmit the combined signal in the optical signal form to an RRU through an optical fiber between the BBU and the RRU. The RRU first converts the combined signal in the optical signal form into a combined signal in an electrical signal form using an optical-to-electrical converter, and then splits the combined signal in the electrical signal form using an LPF whose passband is within 220 MHz, a narrowband band-pass filter whose passband is 440 MHz, a narrowband band-pass filter whose passband is 1.5 GHz, a narrowband band-pass filter whose passband is 1.7 GHz, a narrowband band-pass filter whose passband is 1.8 GHz, and a narrowband band-pass filter whose passband is 2.6 GHz, to separate the first downlink analog baseband signal, the first sampling clock signal, the three downlink carriers, and the uplink frequency mixing signal.

A downlink demultiplexing timing control unit of the RRU may generate a first timing control signal based on the first sampling clock signal. A demultiplexing multiplexer switch of the RRU demultiplexes the first downlink analog baseband signal under control of the first timing control signal, to separate a plurality of second sampling signals corresponding to each second downlink analog baseband signal. The frequency of the first timing control signal is 440 MHz (that is, a sampling frequency is 440 MHz), and a sequence formed by the plurality of second sampling signals output by the demultiplexing multiplexer switch may be:

First second downlink analog baseband signal (1.5 GHz, TDD, 20 MHz): $c_0, c_1, \ldots$.

Second second downlink analog baseband signal (1.8 GHz, FDD, 40 MHz): $d_0^1, d_1^1, d_2^1, d_3^1, \ldots$.

Third second downlink analog baseband signal (1.8 GHz, FDD, 40 MHz): $d_0^2, d_1^2, d_2^2, d_3^2, \ldots$.

Fourth second downlink analog baseband signal (2.6 GHz, TDD, 60 MHz): $e_0^1, e_1^1, e_2^1, e_3^1, e_4^1, e_5^1, \ldots$.

Fifth second downlink analog baseband signal (2.6 GHz, TDD, 60 MHz) $e_0^2, e_1^2, e_2^2, e_3^2, e_4^2, e_5^2, \ldots$.

Because the frequency of the first timing control signal is high, the sampling rate is also high, that is, sampling time of each second sampling signal is very short. Therefore, each second sampling signal needs to be kept for a long enough time using a sample hold device. Understanding is made with reference to FIG. 5A and FIG. 5B. In FIG. 5A and FIG. 5B, an example in which the first second downlink analog baseband signal is performed sampling and holding is used. Duration $$T_0 = \frac{1}{440 \text{ MHz}} \approx 2.72 \text{ nanoseconds (ns)}$$

of each second sampling signal in FIG. 5A is duration $T_0 = \frac{1}{40}$ MHz≈25 ns of each second sampling signal in FIG. 5B after each second sampling signal passes through the sample hold device.

A radio frequency apparatus may further input each second downlink analog baseband signal that passes through the sample hold device into an LPF, to filter out an unnecessary high-frequency component in each second downlink analog baseband signal. Then, an up-converter is used to perform up-conversion frequency mixing on the first second downlink analog baseband signal that passes through the LPF and the downlink carrier of 1.5 GHz, perform the up-conversion frequency mixing on the second second downlink analog baseband signal that passes through the LPF and the downlink carrier of 1.8 GHz, perform the up-conversion frequency mixing on the third second down-link analog baseband signal that passes through the LPF and the downlink carrier of 1.8 GHz, perform the up-conversion frequency mixing on the fourth second downlink analog baseband signal that passes through the LPF and the downlink carrier of 2.6 GHz, and perform the up-conversion frequency mixing on the fifth second downlink analog baseband signal that passes through the LPF and the downlink carrier of 2.6 GHz. The first second downlink analog baseband signal to the fifth second downlink analog baseband signal separately pass through the power amplifier, and are transmitted through an antenna.

The RRU may further receive at least two uplink radio frequency signals through the antenna. In this embodiment, that the RRU receives two uplink radio frequency signals is used as an example for description. A first uplink radio frequency signal works at a carrier on a frequency of 1.5 GHz, a bandwidth is 20 MHz, and a communication manner is the TDD. A second uplink radio frequency signal works at a carrier on a frequency of 1.7 GHz, a bandwidth is 40 MHz, and a communication manner is the FDD. After receiving the two uplink radio frequency signals through the antenna, the RRU separately amplifies the two uplink radio frequency signals using an LNA, and then performs down-conversion frequency mixing on the first uplink radio frequency signal and an uplink frequency mixing signal of 1.5 GHz (namely, the downlink carrier of 1.5 GHz in FIG. 7) using a down-converter, to obtain at least two first uplink analog signals.

Figure 8A:
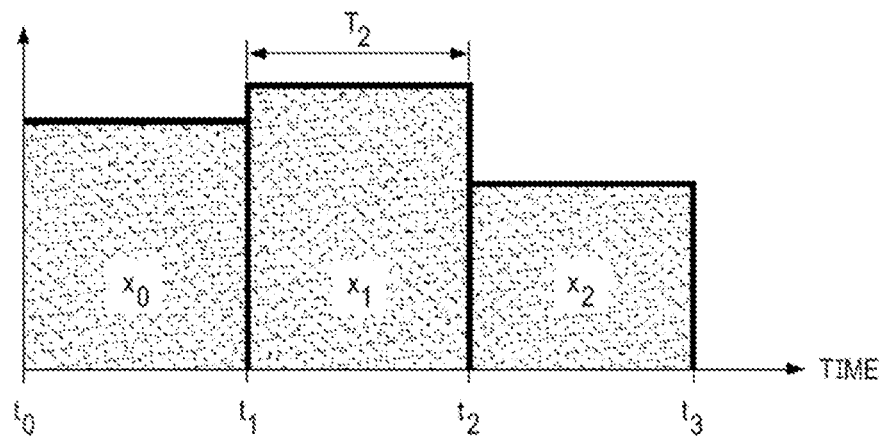
FIG. 8A, FIG. 8B, and FIG. 8C are schematic diagrams of arrangement manners of sampling signals in a signal processing method according to an embodiment of this application.
Figure 8B:
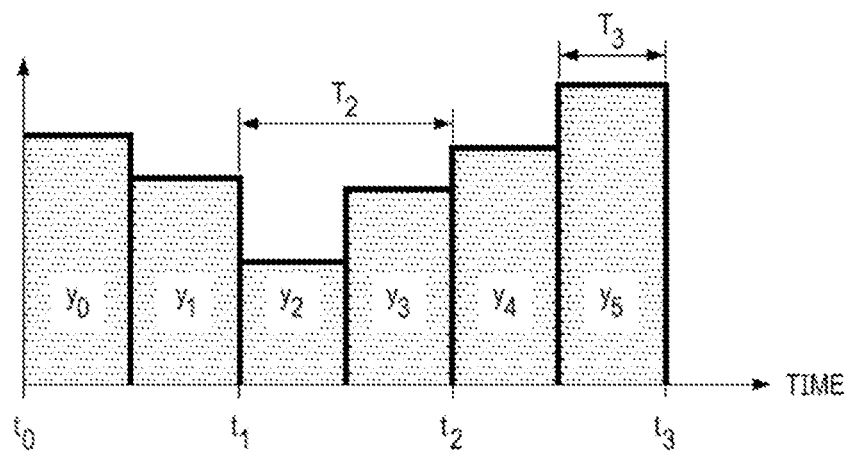
Figure 8C:
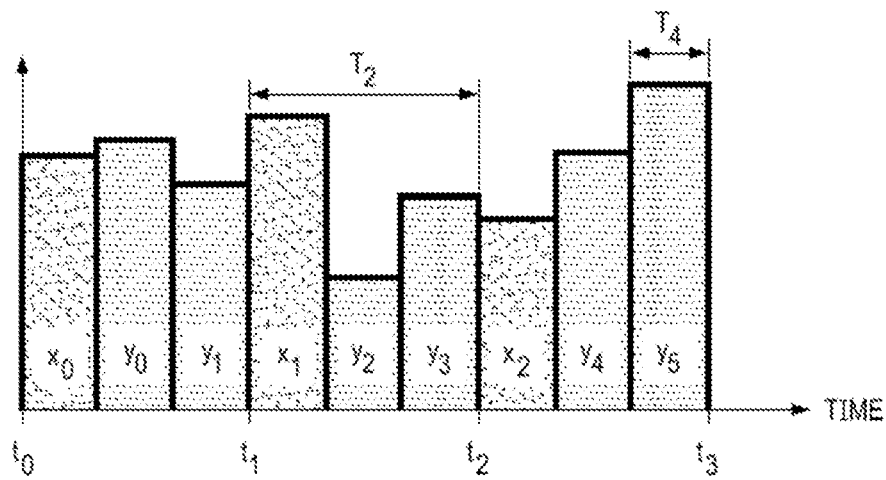

An uplink multiplexing timing control unit of the RRU may generate two sixth timing control signals whose frequency values are respectively 40 MHz and 80 MHz based on the first sampling clock signal. For further understanding of this solution, refer to FIG. 8A to FIG. 8C. FIG. 8A to FIG. 8C are schematic diagrams of arrangement manners of sampling signals in the signal processing method according to this embodiment of this application. FIG. 8A shows an arrangement manner of third sampling signals obtained by sampling the first uplink radio frequency signal. Further, the sample hold device of the RRU samples the first uplink radio frequency signal under control of the sixth timing control signal whose frequency value is 40 MHz (that is, a sampling frequency is 40 MHz). A plurality of obtained third sampling signals are signed as $x_0, x_1, x_2, \ldots x_n$, and duration of each third sampling signal is $T_2 = \frac{1}{40}$ MHz≈25 ns. FIG. 8B shows an arrangement manner of third sampling signal obtained by sampling the second uplink radio frequency signal. Further, the sample hold device samples the second uplink radio frequency signal under control of the sixth timing control signal whose frequency value is 80 MHz (that is, a sampling frequency is 80 MHz). A plurality of obtained third sampling signals are signed as $y_0, y_1, y_2, y_3, y_4, y_5, \ldots y_m$, and duration of each third sampling signal is $T_3 = \frac{1}{80}$ MHz≈12.5 ns.

The uplink multiplexing timing control unit of the RRU may further generate, based on the first sampling clock signal, a second timing control signal whose frequency value is 120 MHz. Under control of the second timing control signal, the multiplexing multiplexer switch in the RRU may multiplex a plurality of third sampling signals obtained by the sample hold device from the two first uplink analog signals into one second uplink analog signal. FIG. 8C shows an arrangement manner of a plurality of third sampling signals in the second uplink analog signal. The arrangement manner of the plurality of third sampling signals in the second uplink analog signal is $x_0, y_0, y_1, x_1, y_2, y_3, x_2, y_4, y_5, \ldots x_n, y_{m-1}, y_m$, and duration of each third sampling signal in the second uplink analog signal is $T_4 = \frac{1}{120}$ MHz≈8.33 ns. Optionally, because the second uplink analog signal output by the multiplexing multiplexer switch is not a smooth analog signal, the LPF may be used to smoothly process the second uplink analog signal.

The RRU converts a second uplink analog signal in an electrical signal form into a second uplink analog signal in an optical signal form using the electrical-to-optical converter, and sends the second uplink analog signal in the optical signal form to the BBU through the optical fiber between the RRU and the BBU. The BBU converts the second uplink analog signal in the optical signal form into a second uplink analog signal in an electrical signal form using the optical-to-electrical converter, and the BBU converts the second uplink analog signal into a first uplink digital signal using the ADC. For a specific arrangement manner of a plurality of signals included in the first uplink digital signal, refer to FIG. 8C. Further, a demultiplexing module is used to demultiplex the first uplink digital signal, to obtain two second uplink digital signals. For a specific arrangement manner of the two second uplink digital signals, refer to FIG. 8A and FIG. 8B. Timing control signals used by the ADC and the demultiplexing module are generated by the uplink multiplexing timing control unit based on the sampling clock signal produced by the frequency generator. It should be understood that, the examples in this embodiment are merely for ease of understanding of this solution, and are not intended to limit this solution.

Figure 9:
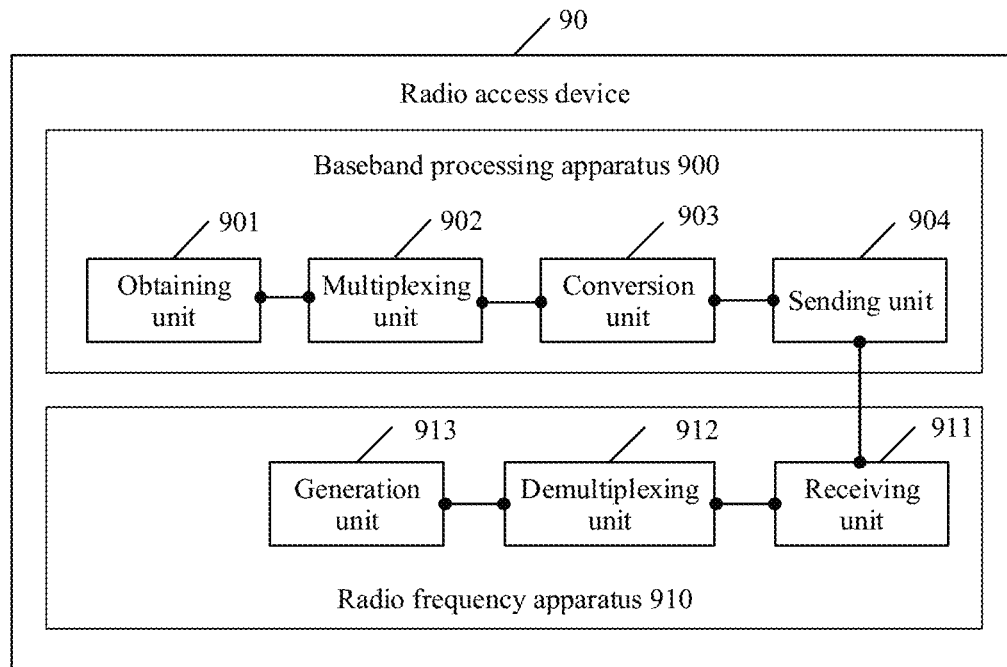
FIG. 9 is a schematic diagram of a structure of a radio access device according to an embodiment of this application.

To better implement the foregoing solutions in the embodiments of this application, the following further provides a related apparatus configured to implement the solutions. Further, refer to FIG. 9. FIG. 9 is a schematic diagram of a structure of a radio access device according to an embodiment of this application. The radio access device 90 includes a baseband processing apparatus 900 and a radio frequency apparatus 910, the baseband processing apparatus 900 includes an obtaining unit 901, a multiplexing unit 902, a conversion unit 903, and a sending unit 904, and the radio frequency apparatus 910 includes a receiving unit 911, a demultiplexing unit 912, and a generation unit 913. The obtaining unit 901 is configured to obtain at least two first downlink digital baseband signals. The multiplexing unit 902 is configured to multiplex the at least two first downlink digital baseband signals obtained by the obtaining unit 901 into one second downlink digital baseband signal. The conversion unit 903 is configured to convert the second downlink digital baseband signal output by the multiplexing unit 902 into a first downlink analog baseband signal. The sending unit 904 is configured to send the first downlink analog baseband signal output by the conversion unit 903 to the radio frequency apparatus. The receiving unit 911 is configured to receive the first downlink analog baseband signal sent by the baseband processing apparatus. The demultiplexing unit 912 is configured to demultiplex the first downlink analog baseband signal received by the receiving unit 911, to obtain at least two second downlink analog baseband signals. The generation unit 913 is configured to generate, based on the at least two second downlink analog baseband signals output by the demultiplexing unit 912, a downlink radio frequency signal to be sent to a terminal device.

In this embodiment of this application, after the obtaining unit 901 obtains the downlink digital signal, the conversion unit 903 first converts the downlink digital baseband signal into the downlink analog baseband signal, and the sending unit 904 sends the downlink analog baseband signal to the radio frequency apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

In a possible design, the obtaining unit 901 is further configured to obtain a downlink carrier corresponding to the at least two first downlink digital baseband signals. The sending unit 904 is further configured to combine the downlink carrier obtained by the obtaining unit 901 and the first downlink analog baseband signal output by the conversion unit 903, and send the combined downlink carrier and first downlink analog baseband signal to the radio frequency apparatus. The downlink carrier is used by the radio frequency apparatus to perform up-conversion frequency mixing on the at least two second downlink analog baseband signals and the downlink carrier, to generate the downlink radio frequency signal to be sent to the terminal device.

In this embodiment of this application, the obtaining unit 901 obtains the downlink carrier, and the sending unit 904 sends the downlink carrier to the radio frequency apparatus. Therefore, the radio frequency apparatus may directly perform the up-conversion frequency mixing using the downlink carrier sent by the sending unit 904. In a scenario in which one baseband processing apparatus simultaneously communicates with a plurality of radio frequency apparatuses, because all downlink carriers used in the plurality of radio frequency apparatuses are downlink carriers generated by a same baseband processing apparatus, frequency deviation between the plurality of radio frequency apparatuses is avoided, and a distributed MIMO function formed by the plurality of radio frequency apparatuses is implemented in a downlink direction.

In a possible design, the sending unit 904 is further configured to combine a sampling clock signal with the first downlink analog baseband signal generated by the conversion unit 903, and send the combined sampling clock signal and first downlink analog baseband signal to the radio frequency apparatus. The sampling clock signal is used to generate a first timing control signal by the radio frequency apparatus for demultiplexing the first downlink analog baseband signal.

In this embodiment of this application, the sending unit 904 sends a first sampling clock signal to the radio frequency apparatus in a combination manner. This ensures the same first sampling clock signal is used between the baseband processing apparatus and the radio frequency apparatus, and feasibility of this solution is improved with a simple and convenient operation.

In a possible design, the receiving unit 911 is further configured to receive the combined downlink carrier and first downlink analog baseband signal sent by the baseband processing apparatus, and split the combined downlink carrier and first downlink analog baseband signal. The generation unit 913 is further configured to perform the up-conversion frequency mixing on the at least two second downlink analog baseband signals output by the demultiplexing unit 912 and the downlink carrier received by the receiving unit 911, to generate the downlink radio frequency signal to be sent to the terminal device.

In this embodiment of this application, the receiving unit 911 receives the combined downlink carrier and the first downlink analog baseband signal sent by the baseband processing apparatus, and obtains the downlink carrier from the combined downlink carrier and first downlink analog baseband signal. Therefore, the generation unit 913 may directly perform the up-conversion frequency mixing using the downlink carrier sent by the baseband processing apparatus. In the scenario in which one baseband processing apparatus simultaneously communicates with the plurality of radio frequency apparatuses, because all the downlink carriers used in the plurality of radio frequency apparatuses are the downlink carriers generated by the same baseband processing apparatus, the frequency deviation between the plurality of radio frequency apparatuses is avoided, and the distributed MIMO function formed by the plurality of radio frequency apparatuses is implemented in the downlink direction.

In a possible design, the receiving unit 911 is further configured to receive the combined sampling clock signal and first downlink analog baseband signal sent by the sending unit 904. The radio frequency apparatus splits the combined sampling clock signal and first downlink analog baseband signal. The demultiplexing unit 912 is further configured to generate the first timing control signal based on the sampling clock signal received by the receiving unit 911, and demultiplex, using the first timing control signal, the first downlink analog baseband signal received by the receiving unit 911, to obtain the at least two second downlink analog baseband signals.

In this embodiment of this application, after receiving the first sampling clock signal sent in the combination manner, the receiving unit 911 may separate the first sampling clock signal from a combined signal using a splitter. This ensures the same first sampling clock signal is used between the baseband processing apparatus and the radio frequency apparatus, and the feasibility of this solution is improved with the simple and convenient operation.

Figure 10:
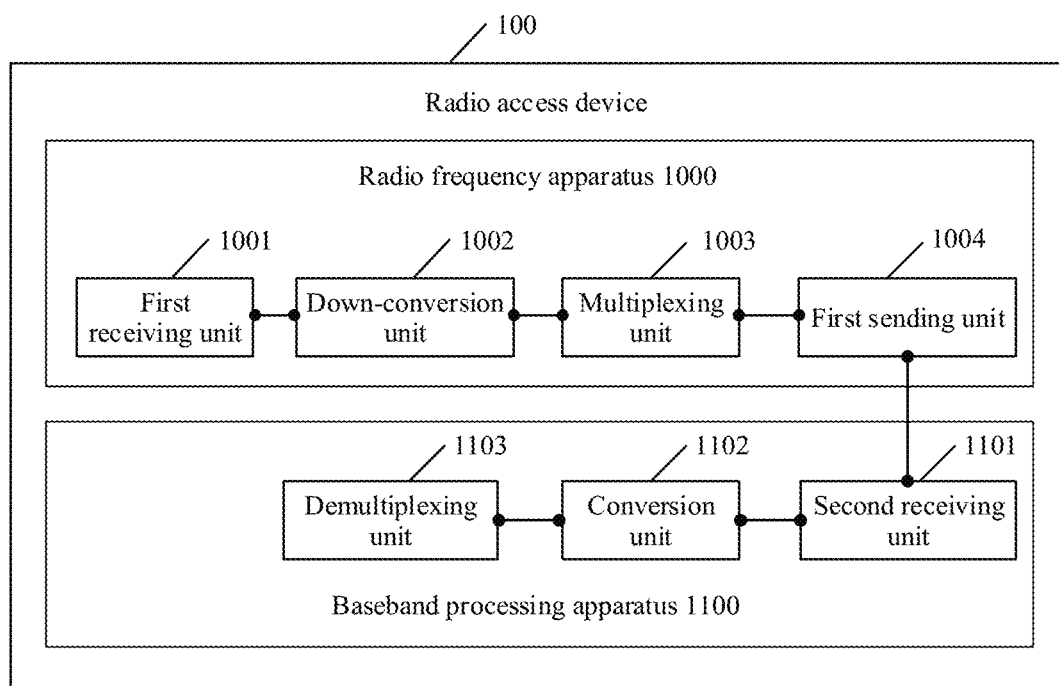
FIG. 10 is a schematic diagram of another structure of a radio access device according to an embodiment of this application.

An embodiment of this application further provides another radio access device. Refer to FIG. 10. FIG. 10 is a schematic diagram of another structure of a radio access device according to an embodiment of this application. The radio access device 100 includes a radio frequency apparatus 1000 and a baseband processing apparatus 1100, the radio frequency apparatus 1000 includes a first receiving unit 1001, a down-conversion unit 1002, a multiplexing unit 1003, and a first sending unit 1004, and the baseband processing apparatus 1100 includes a second receiving unit 1101, a conversion unit 1102, and a demultiplexing unit 1103. The first receiving unit 1001 is configured to receive at least two uplink radio frequency signals sent by a terminal device. The down-conversion unit 1002 is configured to perform down-conversion on the at least two uplink radio frequency signals received by the first receiving unit 1001, to obtain at least two first uplink analog signals. The multiplexing unit 1003 is configured to multiplex the at least two first uplink analog signals output by the down-conversion unit 1002 into a second uplink analog signal. The first sending unit 1004 is configured to send the second uplink analog signal to the baseband processing apparatus. The second receiving unit 1101 is configured to receive the second uplink analog signal sent by the first sending unit 1004. The conversion unit 1102 is configured to convert the second uplink analog signal received by the second receiving unit 1101 into a first uplink digital signal. The demultiplexing unit 1103 is configured to demultiplex the first uplink digital signal output by the conversion unit 1102, to obtain at least two second uplink digital signals.

In this embodiment of this application, after the first receiving unit 1001 obtains the at least two uplink radio frequency signals, the down-conversion unit 1002 performs down-conversion, to obtain the at least two first uplink analog signals, and after the multiplexing unit 1003 multiplexes the at least two first uplink analog signals into one second uplink analog signal, the first sending unit 1004 directly sends the second uplink analog signal to the baseband processing apparatus. Therefore, there is no need to configure a DAC on the radio frequency apparatus, which reduces complexity, power consumption, and heat production of the radio frequency apparatus. In addition, because previous digital signal transmission is converted into analog signal transmission between the baseband processing apparatus and the radio frequency apparatus, costs of optical modules at input/output interfaces of the baseband processing apparatus and the radio frequency apparatus are reduced.

Figure 11:
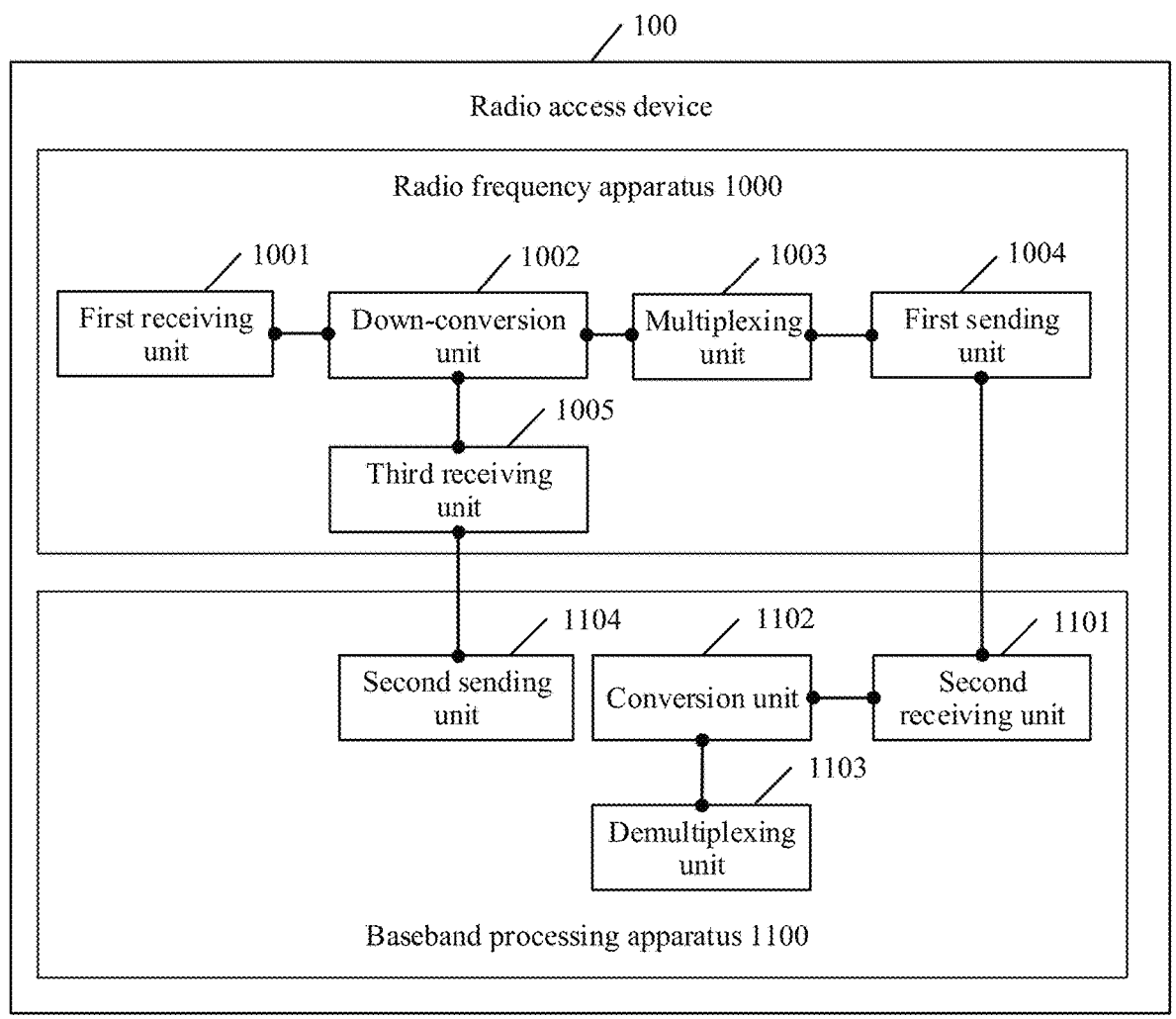
FIG. 11 is a schematic diagram of still another structure of a radio access device according to an embodiment of this application.

In a possible design, refer to FIG. 11. FIG. 11 is a schematic diagram of a still another structure of a radio access device according to an embodiment of this application. The radio frequency apparatus 1000 further includes a third receiving unit 1005, and the baseband processing apparatus 1100 further includes a second sending unit 1104. The third receiving unit 1005 is configured to receive an uplink frequency mixing signal sent by the second sending unit 1104. The down-conversion unit 1002 is further configured to perform down-conversion frequency mixing on the at least two uplink radio frequency signals received by the first receiving unit 1001 and the uplink frequency mixing signal received by the third receiving unit 1005.

In this embodiment of this application, the down-conversion unit 1002 may directly perform the down-conversion frequency mixing using the uplink frequency mixing signal sent by the baseband processing apparatus. In a scenario in which one baseband processing apparatus simultaneously communicates with a plurality of radio frequency apparatuses, because all uplink frequency mixing signals used in the plurality of radio frequency apparatuses are uplink frequency mixing signals generated by a same baseband processing apparatus, frequency deviation between the plurality of radio frequency apparatuses is avoided, and a distributed MIMO function formed by the plurality of radio frequency apparatuses is implemented in an uplink direction.

In a possible design, refer to FIG. 11. The radio frequency apparatus 1000 further includes a third receiving unit 1005, and the baseband processing apparatus 1100 further includes a second sending unit 1104. The third receiving unit 1005 is configured to receive a sampling clock signal sent by the second sending unit 1104. The demultiplexing unit 1103 is further configured to generate a second timing control signal based on the sampling clock signal received by the third receiving unit 1005, and multiplex, using the second timing control signal, the at least two first uplink analog signals received by the first receiving unit 1001 into the second uplink analog signal.

In this embodiment of this application, the third receiving unit 1005 may receive the sampling clock signal that is in an analog signal form and that is sent by the baseband processing apparatus. After obtaining the sampling clock signal, the demultiplexing unit 1103 does not need to perform digital to analog conversion on the sampling clock signal, which alleviates work load of the radio frequency apparatus and improves efficiency in a signal processing process. In addition, when performing an operation in an uplink direction, the radio frequency apparatus may multiplex a sampling clock signal obtained in a downlink direction, which reduces a communication resource between the baseband processing apparatus and the radio frequency apparatus.

In a possible design, refer to FIG. 11. The baseband processing apparatus further includes a second sending unit 1104 configured to send the uplink frequency mixing signal to the third receiving unit 1005, where the uplink frequency mixing signal is used by the down-conversion unit 1002 to perform the down-conversion frequency mixing on the at least two uplink radio frequency signals and the uplink frequency mixing signal.

In this embodiment of this application, the second sending unit 1104 sends the uplink frequency mixing signal to the radio frequency apparatus, and the radio frequency apparatus may directly perform the down-conversion frequency mixing using the uplink frequency mixing signal sent by the baseband processing apparatus. In the scenario in which one baseband processing apparatus simultaneously communicates with the plurality of radio frequency apparatuses, because all uplink frequency mixing signals used in the plurality of radio frequency apparatuses are uplink frequency mixing signals generated by a same baseband processing apparatus, frequency deviation between the plurality of radio frequency apparatuses is avoided, and a distributed MIMO function formed by a plurality of radio frequency apparatuses is implemented in the uplink direction.

In a possible design, refer to FIG. 11. The baseband processing apparatus further includes a second sending unit 1104 configured to send the sampling clock signal to the third receiving unit 1005. The sampling clock signal is used to generate the second timing control signal by the demultiplexing unit 1103 for multiplexing the at least two first uplink analog signals.

In this embodiment of this application, the second sending unit 1104 may send the sampling clock signal to the radio frequency apparatus. After obtaining the sampling clock signal, the demultiplexing unit 1103 does not need to perform digital to analog conversion on the sampling clock signal, which alleviates work load of the radio frequency apparatus and improves efficiency in a signal processing process. In addition, when performing an operation in an uplink direction, the radio frequency apparatus may multiplex a sampling clock signal obtained in a downlink direction, which reduces a communication resource between the baseband processing apparatus and the radio frequency apparatus.

It should be noted that, information interactions and implementation processes between the modules/units in the above apparatus are based on the same concept as the method embodiments of this application. For details, refer to the description in the method embodiments of this application. Details are not described herein again.

Figure 12:
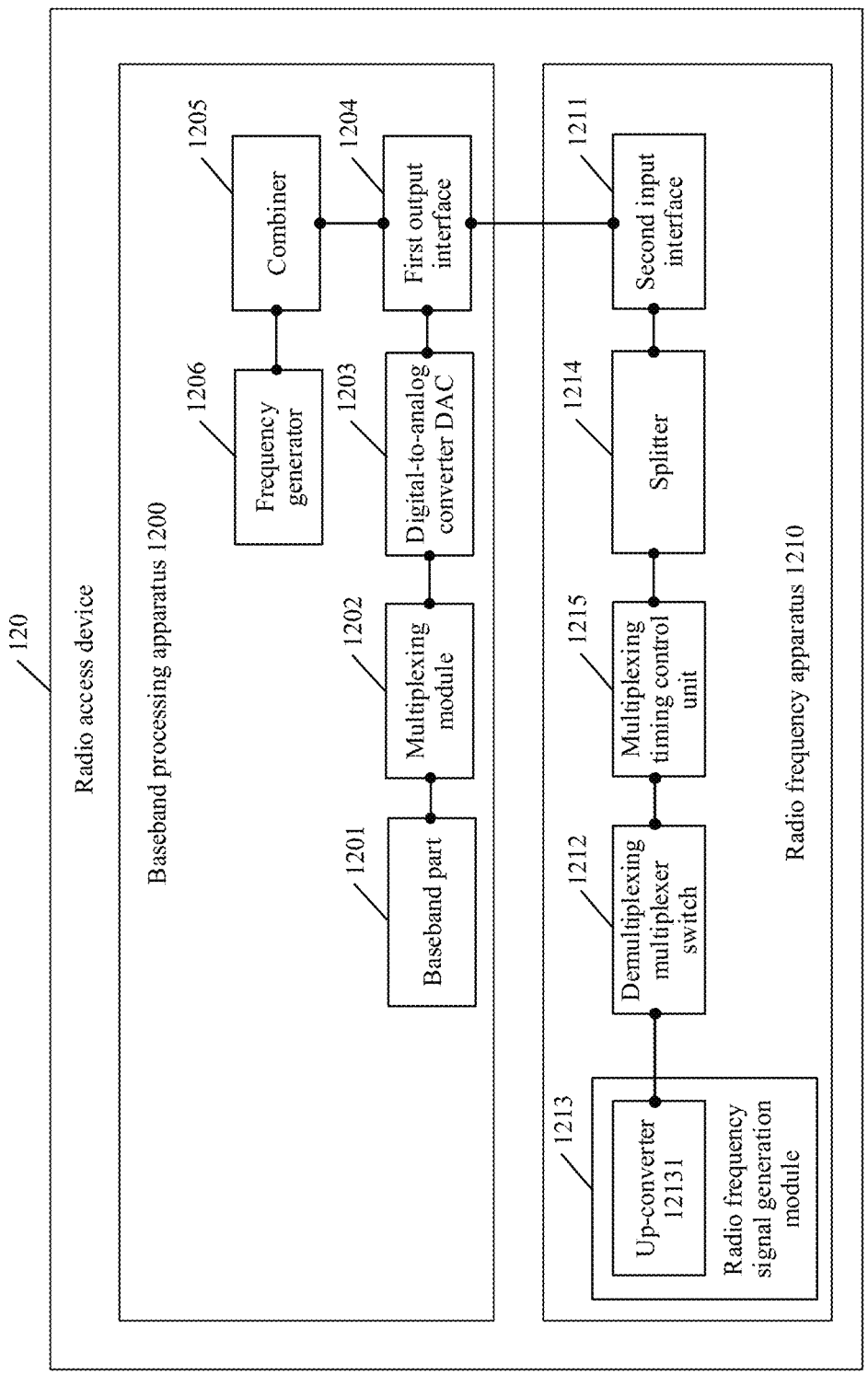
FIG. 12 is a schematic diagram of still another structure of a radio access device according to an embodiment of this application.

An embodiment of this application further provides another radio access device. The baseband processing apparatus 900 and the radio frequency apparatus 910 in the embodiment corresponding to FIG. 9 may be deployed on the radio access device. The radio access device includes an element that is in the baseband processing apparatus 10 corresponding to FIG. 2A and that is configured to implement a function in a downlink direction, and an element that is in the radio frequency apparatus 20 corresponding to FIG. 2B and that is configured to implement a function in a downlink direction. Further, refer to FIG. 12. FIG. 12 is a schematic diagram of a still another structure of the radio access device according to this embodiment of this application. The radio access device 120 includes a baseband processing apparatus 1200 and a radio frequency apparatus 1210, the baseband processing apparatus includes a baseband part 1201, a multiplexing module 1202, a DAC 1203, and a first output interface 1204, and the radio frequency apparatus 1210 includes a second input interface 1211, a demultiplexing multiplexer switch 1212, and a radio frequency signal generation module 1213.

The baseband part 1201 is configured to obtain at least two first downlink digital baseband signals. The multiplexing module 1202 is configured to multiplex the at least two first downlink digital baseband signals obtained by the baseband part 1201 into one second downlink digital baseband signal. The DAC 1203 is configured to convert the second downlink digital baseband signal output by the multiplexing multiplexer switch into a first downlink analog baseband signal, and send the first downlink analog baseband signal to the radio frequency apparatus through the first output interface 1204. The second input interface 1211 is configured to receive the first downlink analog baseband signal sent by the baseband processing apparatus. The demultiplexing multiplexer switch 1212 is configured to demultiplex the first downlink analog baseband signal received by the second input interface 1211, to obtain at least two second downlink analog baseband signals. The radio frequency signal generation module 1213 is configured to generate, based on the at least two second downlink analog baseband signals output by the demultiplexing multiplexer switch 1212, a downlink radio frequency signal to be sent to a terminal device.

In a possible design, the baseband processing apparatus 1200 further includes a combiner 1205 and a frequency generator 1206.

The combiner 1205 is configured to obtain, from the frequency generator 1206, a downlink carrier corresponding to the at least two first downlink digital baseband signals, and combine the downlink carrier and the first downlink analog baseband signal. The first output interface 1204 is further configured to send the combined downlink carrier and first downlink analog baseband signal output by the combiner 1205 to the radio frequency apparatus. The downlink carrier is used by the radio frequency apparatus to perform up-conversion frequency mixing on the at least two second downlink analog baseband signals and the downlink carrier, to generate the downlink radio frequency signal to be sent to the terminal device.

In a possible design, the baseband processing apparatus 1200 further includes a combiner 1205 and a frequency generator 1206.

The combiner 1205 is configured to combine a sampling clock signal generated by the frequency generator 1206 with the first downlink analog baseband signal.

The first output interface 1204 is further configured to send the combined sampling clock signal and first downlink analog baseband signal output by the combiner 1205 to the radio frequency apparatus. The sampling clock signal is used to generate a first timing control signal by the radio frequency apparatus for demultiplexing the first downlink analog baseband signal.

In a possible design, the radio frequency apparatus 1210 further includes a splitter 1214, and the radio frequency signal generation module 1213 includes an up-converter 12131. The second input interface 1211 is further configured to receive the combined downlink carrier and first downlink analog baseband signal sent by the baseband processing apparatus. The splitter 1214 is configured to split the combined downlink carrier and first downlink analog baseband signal obtained by the second input interface 1211. The up-converter 12131 is configured to perform the up-conversion frequency mixing on the at least two second downlink analog baseband signals and the downlink carrier, to generate the downlink radio frequency signal to be sent to the terminal device.

In a possible design, the radio frequency apparatus further includes a splitter 1214 and a downlink demultiplexing timing control unit 1215. The second input interface 1211 is further configured to receive the combined sampling clock signal and first downlink analog baseband signal sent by the baseband processing apparatus. The splitter 1214 is configured to split the combined sampling clock signal and first downlink analog baseband signal obtained by the second input interface 1211. The downlink demultiplexing timing control unit 1215 is configured to generate the first timing control signal based on the sampling clock signal output by the splitter 1214. The demultiplexing multiplexer switch 1212 is further configured to demultiplex the first downlink analog baseband signal using the first timing control signal generated by the downlink demultiplexing timing control unit 1215, to obtain the at least two second downlink analog baseband signals.

Figure 13:
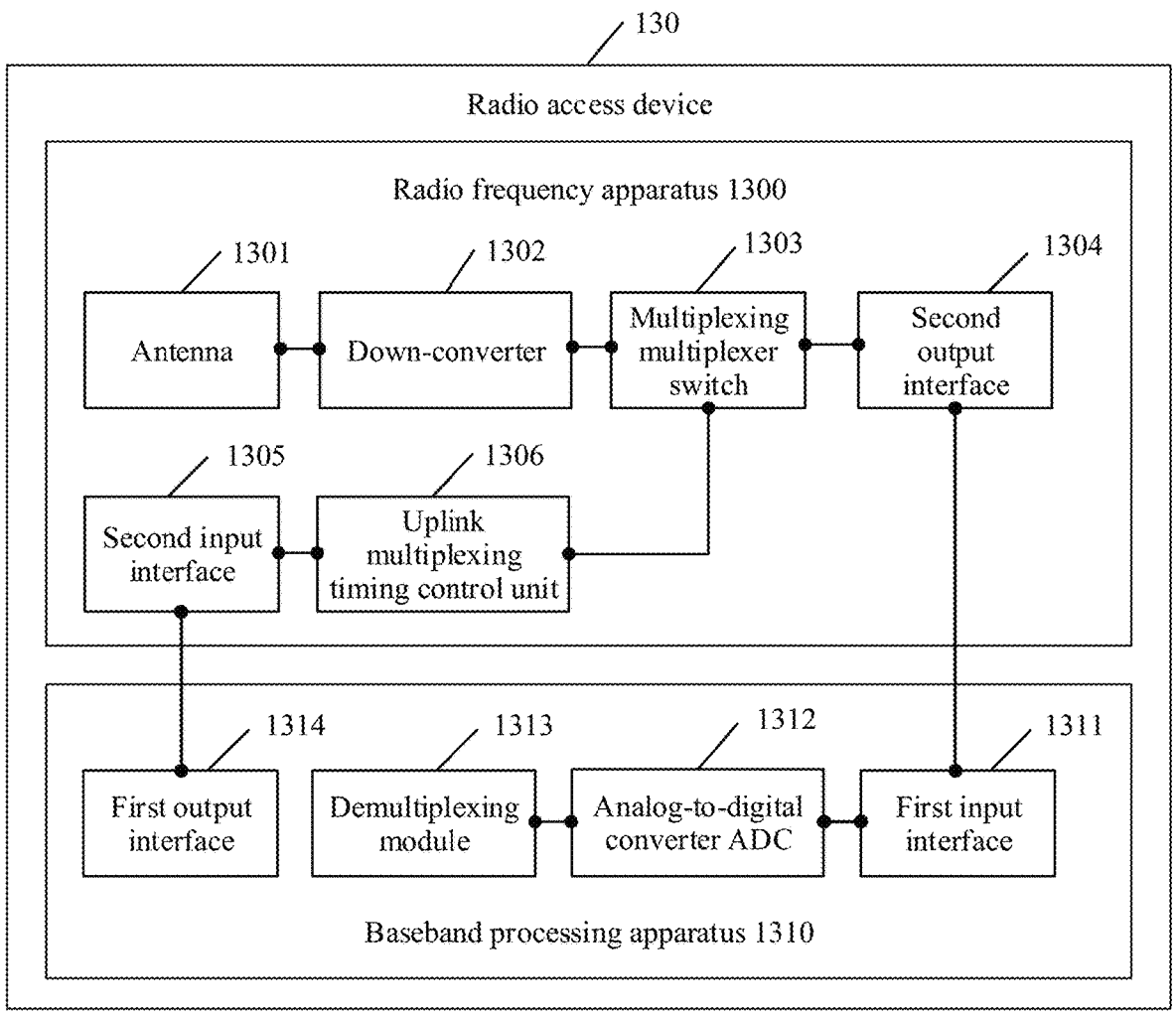
FIG. 13 is a schematic diagram of still another structure of a radio access device according to an embodiment of this application.

An embodiment of this application further provides another radio access device. The radio frequency apparatus 1000 and the baseband processing apparatus 1100 in the embodiments corresponding to FIG. 10 and FIG. 11 may be deployed on the radio access device. The radio access device includes an element that is in the baseband processing apparatus 10 corresponding to FIG. 2A and that is configured to implement a function in an uplink direction, and an element that is in the radio frequency apparatus 20 corresponding to FIG. 2B and that is configured to implement a function in an uplink direction. Further, refer to FIG. 13. FIG. 13 is a schematic diagram of a still another structure of the radio access device according to this embodiment of this application. The radio access device 130 includes a radio frequency apparatus 1300 and a baseband processing apparatus 1310, the radio frequency apparatus includes an antenna 1301, a down-converter 1302, a multiplexing multiplexer switch 1303, and a second output interface 1304, and the baseband processing apparatus 1310 includes a first input interface 1311, an ADC 1312, and a demultiplexing module 1313.

The antenna 1301 is configured to receive at least two uplink radio frequency signals sent by a terminal device. The down-converter 1302 is configured to perform down-conversion on the at least two uplink radio frequency signals received by the antenna 1301, to obtain at least two first uplink analog signals. The multiplexing multiplexer switch 1303 is configured to multiplex the at least two first uplink analog signals output by the down-converter 1302 into a second uplink analog signal, and send, to the baseband processing apparatus using the second output interface 1304, the second uplink analog signal output by the multiplexing multiplexer switch 1303. The first input interface 1311 is configured to receive the second uplink analog signal sent by the radio frequency apparatus. The ADC 1312 is configured to convert the second uplink analog signal received by the first input interface 1311 into a first uplink digital signal. The demultiplexing module 1313 is configured to demultiplex the first uplink digital signal converted by the ADC 1312, to obtain at least two second uplink digital signals.

In a possible design, the radio frequency apparatus further includes a second input interface 1305 configured to receive an uplink frequency mixing signal sent by the baseband processing apparatus. The down-converter 1302 is further configured to perform down-conversion frequency mixing on the at least two uplink radio frequency signals and the uplink frequency mixing signal obtained by the second input interface 1305.

In a possible design, the radio frequency apparatus further includes a second input interface 1305 and an uplink multiplexing timing control unit 1306, the second input interface 1305 is configured to receive a sampling clock signal sent by the baseband processing apparatus, and the uplink multiplexing timing control unit 1306 is configured to generate a second timing control signal based on the sampling clock signal obtained by the second input interface 1305. The multiplexing multiplexer switch 1303 is further configured to multiplex the at least two first uplink analog signals into the second uplink analog signal using the second timing control signal.

In a possible design, the baseband processing apparatus further includes a first output interface 1314 configured to send an uplink frequency mixing signal to the radio frequency apparatus. The uplink frequency mixing signal is used by the radio frequency apparatus to perform the down-conversion frequency mixing on the at least two uplink radio frequency signals and the uplink frequency mixing signal.

In a possible design, the baseband processing apparatus further includes a first output interface 1314 configured to send a sampling clock signal to the radio frequency apparatus. The sampling clock signal is used to generate a second timing control signal by the radio frequency apparatus for multiplexing the at least two first uplink analog signals.

It should be noted that content such as information exchange between the modules/units of the apparatus and the execution processes thereof is based on the same idea as the method embodiments of this application, and brings the same technical effects as the method embodiments of this application. For details, refer to the foregoing description in the method embodiments of this application. Details are not described herein again.

An embodiment of this application further provides a computer program product. When the computer program product runs on a computer, the computer is enabled to perform the steps performed by the radio access device in the method described in the embodiment shown in FIG. 3 to FIG. 5A and FIG. 5B, or the computer is enabled to perform the steps performed by the radio access device in the method described in the embodiment shown in FIG. 6.

An embodiment of this application further provides a computer-readable storage medium. The computer-readable storage medium stores a program used for signal processing. When the program runs on a computer, the computer is enabled to perform the steps performed by the radio access device in the method described in the embodiment shown in FIG. 3 to FIG. 5A and FIG. 5B, or the computer is enabled to perform the steps performed by the radio access device in the method described in the embodiment shown in FIG. 6.

The baseband processing apparatus or the radio frequency apparatus provided in the embodiments of this application may be further a chip. The chip includes a processing unit and a communications unit. The processing unit may be, for example, a processor, and the communications unit may be, for example, an input/output interface, a pin, or a circuit. The processing unit may execute a computer-executable instruction stored in a storage unit such that the chip in a radio access device performs the signal processing method described in the embodiment shown in FIG. 3 to FIG. 5A and FIG. 5B, or so that the chip in the radio access device performs the signal processing method described in the embodiment shown in FIG. 6. Optionally, the storage unit may be a storage unit in the chip, such as a register or a buffer, or the storage unit may be a storage unit in the radio access device end but outside the chip, such as a read-only memory (ROM), another type of static storage device capable of storing static information and instructions, or a random-access memory (RAM).

The processor mentioned anywhere above may be a general-purpose central processing unit (CPU), a microprocessor, an application-specific integrated circuit (ASIC), or one or more integrated circuits for controlling program execution of the method in the first aspect.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be implemented as one or more communications buses or signal cables.

Based on the description of the foregoing implementations, a person skilled in the art may clearly understand that this application may be implemented by software in addition to necessary universal hardware, or by special-purpose hardware, including a dedicated integrated circuit, a dedicated CPU, a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit. However, as for this application, software program implementation is a better implementation in most cases. Based on such an understanding, the technical solutions of this application essentially or the part contributing to the other approaches may be implemented in a form of a software product. The computer software product is stored in a readable storage medium, such as a FLOPPY DISK, a Universal Serial Bus (USB) flash drive, a removable hard disk, a ROM, a RAM, a magnetic disk, or an optical disc of a computer, and includes several instructions for instructing a computer device (which may be a personal computer, a server, or a network device) to perform the methods described in the embodiments of this application.

All or some of the foregoing embodiments may be implemented using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions are generated according to the embodiments of the present disclosure. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, a solid-state drive (SSD)), or the like.

What is claimed is:

1. A signal processing method implemented by a radio access device comprising a baseband processing apparatus and a radio frequency apparatus, wherein the signal processing method comprises:
   obtaining, by the baseband processing apparatus, a plurality of first downlink digital baseband signals;
   multiplexing, by the baseband processing apparatus, the first downlink digital baseband signals into a second downlink digital baseband signal;
   obtaining, by the baseband processing apparatus, a downlink carrier corresponding to the first downlink digital baseband signals;
   converting, by the baseband processing apparatus, the second downlink digital baseband signal into a first downlink analog baseband signal;
   combining, by the baseband processing apparatus, the downlink carrier and the first downlink analog baseband signal to obtain a combined downlink carrier signal;
   sending, by the baseband processing apparatus, the combined downlink carrier signal to the radio frequency apparatus, wherein the downlink carrier enables the radio frequency apparatus to perform up-conversion frequency mixing on a plurality of second downlink analog baseband signals and the downlink carrier to generate a downlink radio frequency signal to be sent to a terminal device;
   receiving, by the radio frequency apparatus, the combined downlink carrier signal from the baseband processing apparatus;
   demultiplexing, by the radio frequency apparatus, the first downlink analog baseband signal to obtain the second downlink analog baseband signals; and
   generating, by the radio frequency apparatus based on the second downlink analog baseband signals, the downlink radio frequency signal to be sent to the terminal device.

2. The signal processing method of claim 1, further comprising:
   obtaining, by the baseband processing apparatus, a sampling clock signal; and
   further combining, by the baseband processing apparatus, the downlink carrier, the first downlink analog baseband signal, and the sampling clock signal to obtain the combined downlink carrier signal,
   wherein the sampling clock signal enables the radio frequency apparatus to generate a first timing control signal for demultiplexing the first downlink analog baseband signal.

3. The signal processing method of claim 1, further comprising:
   splitting, by the radio frequency apparatus, the combined downlink carrier signal; and
   performing, by the radio frequency apparatus, the up-conversion frequency mixing on the second downlink analog baseband signals and the downlink carrier to generate the downlink radio frequency signal to be sent to the terminal device.

4. The signal processing method of claim 2, further comprising:
   splitting, by the radio frequency apparatus, the combined downlink carrier signal;

generating, by the radio frequency apparatus, the first timing control signal based on the sampling clock signal; and further demultiplexing, by the radio frequency apparatus, the first downlink analog baseband signal using the first timing control signal.

5. The signal processing method of claim 1, wherein the downlink carrier has a frequency of about 1.8 gigahertz (GHz).

6. A signal processing method implemented by a radio access device comprising a radio frequency apparatus and a baseband processing apparatus, wherein the signal processing method comprises:

receiving, by the radio frequency apparatus, a plurality of uplink radio frequency signals from a terminal device;

receiving, by the radio frequency apparatus, an uplink frequency mixing signal from the baseband processing apparatus;

performing, by the radio frequency apparatus, down-conversion frequency mixing on the uplink radio frequency signals and the uplink frequency mixing signal to obtain a plurality of first uplink analog signals;

multiplexing, by the radio frequency apparatus, the first uplink analog signals into a second uplink analog signal;

sending, by the radio frequency apparatus, the second uplink analog signal to the baseband processing apparatus;

receiving, by the baseband processing apparatus, the second uplink analog signal sent by the radio frequency apparatus;

converting, by the baseband processing apparatus, the second uplink analog signal into a first uplink digital signal; and demultiplexing, by the baseband processing apparatus, the first uplink digital signal, to obtain a plurality of second uplink digital signals.

7. The signal processing method of claim 6, further comprising:

receiving, by the radio frequency apparatus, a sampling clock signal from the baseband processing apparatus;

generating, by the radio frequency apparatus, a second timing control signal based on the sampling clock signal; and further multiplexing, by the radio frequency apparatus, the first uplink analog signals into the second uplink analog signal using the second timing control signal.

8. The signal processing method of claim 6, further comprising sending, by the baseband processing apparatus, the uplink frequency mixing signal to the radio frequency apparatus, wherein the uplink frequency mixing signal enables the radio frequency apparatus to perform the down-conversion frequency mixing.

9. The signal processing method of claim 6, further comprising sending, by the baseband processing apparatus, a sampling clock signal to the radio frequency apparatus, wherein the sampling clock signal enables the radio frequency apparatus to generate a second timing control signal for multiplexing the first uplink analog signals.

10. The signal processing method of claim 6, wherein the uplink frequency mixing signal has a frequency of about 2.4 gigahertz (GHz).

11. A radio access device comprising:

a baseband processing apparatus comprising:

a baseband part configured to obtain a plurality of first downlink digital baseband signals;

a multiplexing system coupled to the baseband part and configured to multiplex the first downlink digital baseband signals into a second downlink digital baseband signal;

a frequency generator configured to generate a sampling clock signal;

a digital-to-analog converter (DAC) coupled to the multiplexing system and configured to convert the second downlink digital baseband signal from the multiplexing system into a first downlink analog baseband signal;

a combiner coupled to the frequency generator and the DAC and configured to combine the sampling clock signal with the first downlink analog baseband signal to obtain a combined sampling clock signal; and a first output interface configured to send the combined sampling clock signal, wherein the sampling dock signal enables generation of a first timing control signal for demultiplexing the first downlink analog baseband signal; and a radio frequency apparatus comprising:

a second input interface configured to receive the combined sampling clock signal from the baseband processing apparatus;

a demultiplexing multiplexer switch configured to demultiplex the first downlink analog baseband signal to obtain a plurality of second downlink analog baseband signals; and a radio frequency signal generation system coupled to the demultiplexing multiplexer switch and configured to generate, based on the second downlink analog baseband signals, a downlink radio frequency signal to be sent to a terminal device.

12. The radio access device of claim 11, wherein the frequency generator is further configured to generate a downlink carrier corresponding to the first downlink digital baseband signals, wherein the combiner is further configured to:

obtain, from the frequency generator, the downlink carrier; and further combine the sampling clock signal, the first downlink analog baseband signal, and the downlink carrier to obtain the combined sampling clock signal, and wherein the downlink carrier enables the radio frequency apparatus to perform up-conversion frequency mixing on the second downlink analog baseband signals and the downlink carrier to generate the downlink radio frequency signal to be sent to the terminal device.

13. The radio access device of claim 12, wherein the radio frequency apparatus further comprises a splitter configured to split the combined sampling clock signal, and wherein the radio frequency signal generation system comprises an up-converter configured to perform the up-conversion frequency mixing on the second downlink analog baseband signals and the downlink carrier to generate the downlink radio frequency signal to be sent to the terminal device.

14. The radio access device of claim 11, wherein the radio frequency apparatus further comprises:

a splitter configured to split the combined sampling clock signal; and a downlink demultiplexing timing control system is configured to generate the first timing control signal based on the sampling clock signal, and wherein the demultiplexing multiplexer switch is further configured to further demultiplex the first downlink analog baseband signal using the first timing control signal.

15. The radio access device of claim 11, wherein the sampling clock signal has a frequency of about 440 megahertz (MHz).

16. A radio access device comprising:
a radio frequency apparatus comprising:
an antenna configured to receive a plurality of uplink radio frequency signals from a terminal device;
a second input interface configured to receive a sampling clock signal;
a down-converter coupled to the antenna and configured to perform down-conversion on the uplink radio frequency signals to obtain a plurality of first uplink analog signals;
an uplink multiplexing timing control system configured to generate a second timing control signal based on the sampling clock signal; and
a multiplexing multiplexer switch coupled to the down-converter and configured to:
multiplex the first uplink analog signals into a second uplink analog signal using the second timing control signal; and
send the second uplink analog signal through a second output interface; and
a baseband processing apparatus comprising:
a first input interface configured to receive the second uplink analog signal from the multiplexing multiplexer switch;
an analog-to-digital converter (ADC) coupled to the first input interface and configured to convert the second uplink analog signal into a first uplink digital signal; and
a demultiplexing system coupled to the ADC and configured to demultiplex the first uplink digital signal to obtain a plurality of second uplink digital signals.

17. The radio access device of claim 16, wherein the second input interface is configured to receive an uplink frequency mixing signal from the baseband processing apparatus, and wherein the down-converter is further configured to perform down-conversion frequency mixing on the uplink radio frequency signals and the uplink frequency mixing signal.

18. The radio access device of claim 16, wherein the baseband processing apparatus further comprises a first output interface configured to send an uplink frequency mixing signal to the radio frequency apparatus, and wherein the uplink frequency mixing signal enables the radio frequency apparatus to perform down-conversion frequency mixing on the uplink radio frequency signals and the uplink frequency mixing signal.

19. The radio access device of claim 16, wherein the baseband processing apparatus further comprises a first output interface configured to send the sampling clock signal to the radio frequency apparatus, and wherein the sampling clock signal enables the radio frequency apparatus to generate the second timing control signal.

20. The radio access device of claim 16, wherein the sampling clock signal has a frequency of about 560 megahertz (MHz).

* * * * *